(12) United States Patent
Umbro et al.

(10) Patent No.: US 9,446,777 B2
(45) Date of Patent: Sep. 20, 2016

(54) WHEELED CARRIER WITH BRAKES

(71) Applicants: Gerald Umbro, Rhinebeck, NY (US); Rosemary Kavanaugh, Rhinebeck, NY (US); Joseph Umbro, Red Hook, NY (US); David Tessel, Riverdale, NY (US)

(72) Inventors: Gerald Umbro, Rhinebeck, NY (US); Rosemary Kavanaugh, Rhinebeck, NY (US); Joseph Umbro, Red Hook, NY (US); David Tessel, Riverdale, NY (US)

(73) Assignee: UMBRO TOOL CORPORATION LLC, Rhinebeck, NY (US)

( * ) Notice: Subject to any disclaimer, the term of this patent is extended or adjusted under 35 U.S.C. 154(b) by 37 days.

(21) Appl. No.: 14/445,176

(22) Filed: Jul. 29, 2014

(65) Prior Publication Data

US 2015/0035259 A1    Feb. 5, 2015

Related U.S. Application Data

(63) Continuation-in-part of application No. 12/322,972, filed on Feb. 9, 2009, now Pat. No. 8,789,836.

(60) Provisional application No. 61/026,867, filed on Feb. 7, 2008.

(51) Int. Cl.
| | |
|---|---|
| *B62B 1/04* | (2006.01) |
| *B62B 1/06* | (2006.01) |
| *B62B 1/26* | (2006.01) |
| *B62B 5/04* | (2006.01) |
| *B62B 5/06* | (2006.01) |

(52) U.S. Cl.
CPC ............... *B62B 1/042* (2013.01); *B62B 1/06* (2013.01); *B62B 1/264* (2013.01); *B62B 5/049* (2013.01); *B62B 5/065* (2013.01)

(58) Field of Classification Search
CPC ...................................................... B62B 1/264
USPC ............ 280/47.33, 47.32, 9, 10, 7.12, 79.5; 188/19
See application file for complete search history.

(56) References Cited

U.S. PATENT DOCUMENTS

| | | | | |
|---|---|---|---|---|
| 1,658,302 A | * | 2/1928 | Renaud | B62M 11/00 280/256 |
| 2,539,686 A | * | 1/1951 | Balientine | B62B 19/02 280/10 |
| 2,544,163 A | * | 3/1951 | Hyde | B62B 19/02 280/11 |
| 2,759,738 A | * | 8/1956 | Reiter | A47B 31/00 108/15 |
| 2,817,536 A | * | 12/1957 | Taggert | B62B 19/02 280/11 |
| 2,869,885 A | * | 1/1959 | Doyle, Jr. | B60B 37/10 280/47.17 |

(Continued)

*Primary Examiner* — Jeffrey J Restifo
(74) *Attorney, Agent, or Firm* — Ostrolenk Faber LLP

(57) ABSTRACT

A portable transporting carrier for standard size buckets and for standard size propane gas tanks with wheels connected by an axle element and configured to position and support the bucket or the tank on the axle element and with an offset handle positioned over a center of gravity of the bucket or tank to facilitate lifting and carrying of the carrier with supported bucket or tank. The carrier is optionally convertible to a transportable working skid.

15 Claims, 37 Drawing Sheets

(56) References Cited

U.S. PATENT DOCUMENTS

| | | | | |
|---|---|---|---|---|
| 4,109,740 A * | 8/1978 | Andruchiw | | B62B 5/023 180/8.2 |
| 4,251,085 A * | 2/1981 | Lageer | | B62B 13/18 280/10 |
| 4,635,951 A * | 1/1987 | Berfield | | B62B 5/0006 280/47.34 |
| 4,753,445 A * | 6/1988 | Ferrare | | B62B 1/264 280/47.131 |
| 4,756,540 A * | 7/1988 | Crawford | | B62B 1/145 280/47.21 |
| 5,088,751 A * | 2/1992 | Zint | | B62B 3/104 280/47.34 |
| 5,393,080 A * | 2/1995 | Ross | | B62B 1/264 280/47.26 |
| 5,415,420 A * | 5/1995 | Koeller | | B62B 1/264 248/215 |
| 5,881,846 A * | 3/1999 | French | | B62B 5/049 188/1.12 |
| 6,042,130 A * | 3/2000 | Souza | | B62B 1/12 280/79.5 |
| 6,125,972 A * | 10/2000 | French | | B62B 5/049 188/1.12 |
| 6,293,273 B1 * | 9/2001 | Byrne | | B62B 1/264 126/276 |
| 6,382,642 B1 * | 5/2002 | Rainey | | B62B 1/264 280/47.24 |
| 6,386,557 B1 * | 5/2002 | Weldon | | A47B 13/16 108/12 |
| 6,454,281 B1 * | 9/2002 | Pearson | | B62B 1/125 280/47.26 |
| 6,481,540 B1 * | 11/2002 | Nolting, Jr. | | B62B 5/0442 188/166 |
| 6,554,300 B1 * | 4/2003 | Ziolkowski | | B62B 1/264 280/47.27 |
| 6,824,148 B1 * | 11/2004 | Key | | B62B 19/02 280/13 |
| 8,262,106 B1 * | 9/2012 | Suszynsky | | B62B 5/002 280/47.131 |
| 8,915,505 B2 * | 12/2014 | Plesh | | B62B 1/12 280/47.131 |
| 9,108,657 B2 * | 8/2015 | Hussain | | B62B 5/0414 |
| 2003/0020249 A1 * | 1/2003 | Webster | | B62D 61/12 280/43 |
| 2004/0183268 A1 * | 9/2004 | Hartsock | | B62B 3/04 280/79.5 |
| 2004/0245735 A1 * | 12/2004 | Pins | | B62B 1/142 280/79.5 |
| 2005/0279589 A1 * | 12/2005 | Gray | | B60K 7/0007 188/32 |
| 2009/0014979 A1 * | 1/2009 | Snook | | B62B 1/264 280/200 |
| 2010/0013178 A1 * | 1/2010 | Blair | | B62B 1/06 280/47.27 |
| 2012/0141238 A1 * | 6/2012 | McFarland | | B62B 1/14 414/444 |
| 2013/0094928 A1 * | 4/2013 | McFarland | | B62B 1/12 414/457 |
| 2013/0306411 A1 * | 11/2013 | Hussain | | B62B 5/0414 188/19 |
| 2013/0334797 A1 * | 12/2013 | Umbro | | B62B 1/042 280/654 |
| 2015/0035259 A1 * | 2/2015 | Umbro | | B62B 1/042 280/654 |
| 2015/0090539 A1 * | 4/2015 | Degnan | | B62B 5/0433 188/19 |
| 2015/0259002 A1 * | 9/2015 | Reddi | | B62B 1/04 280/47.18 |

* cited by examiner

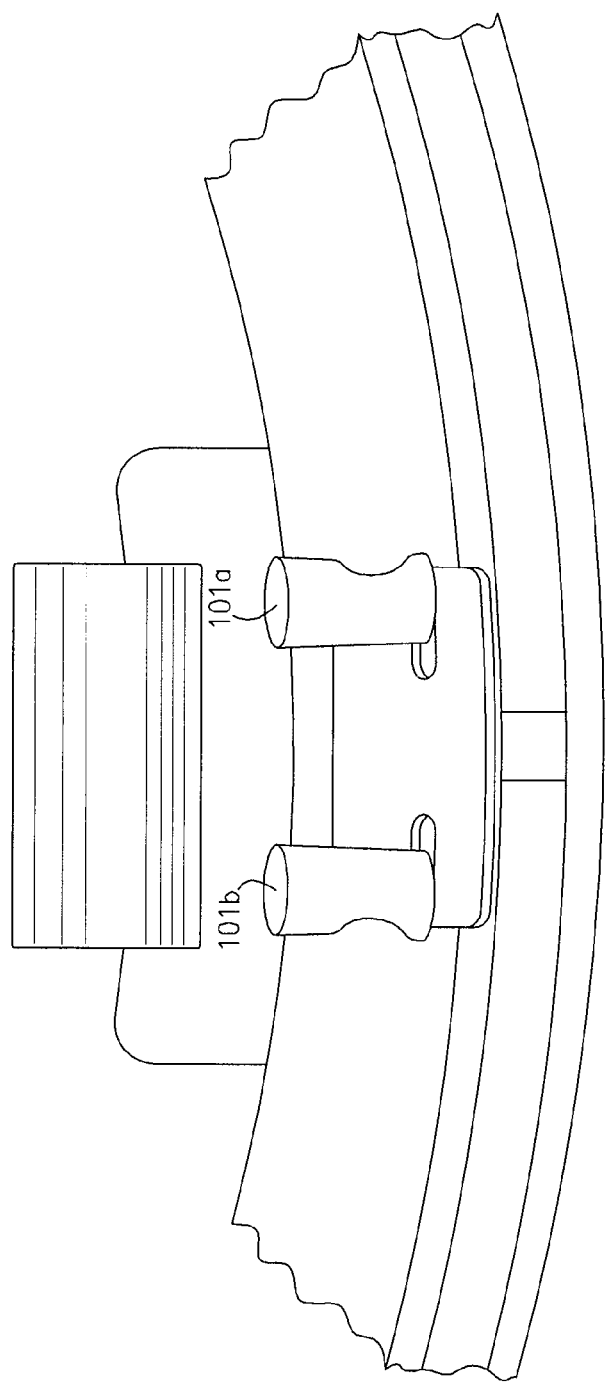

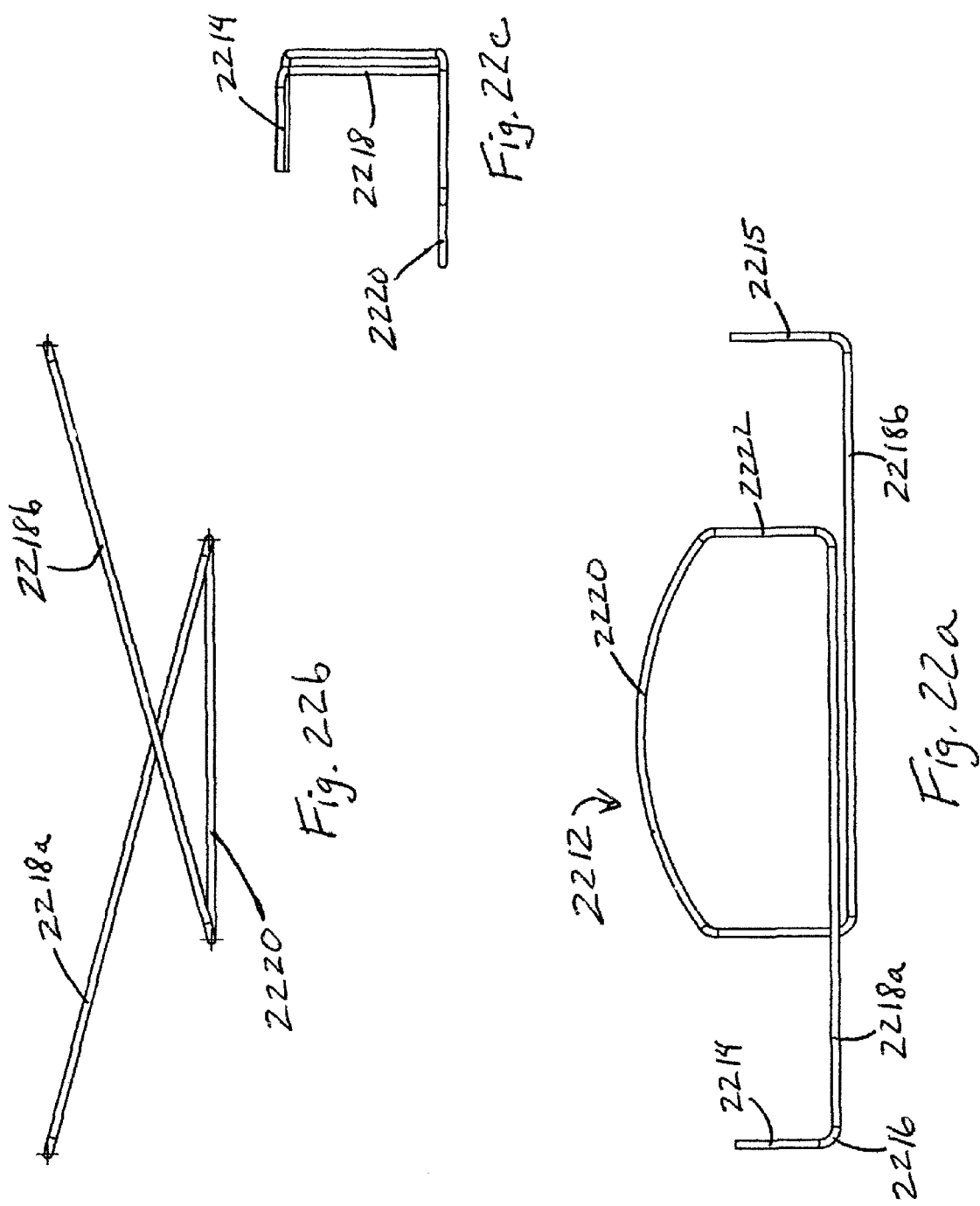

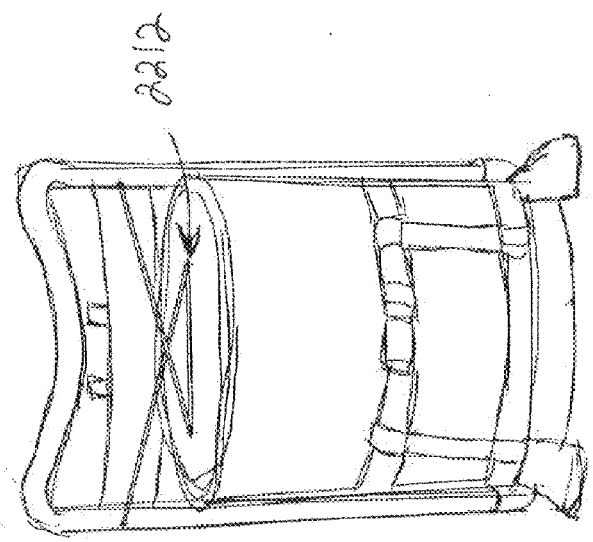
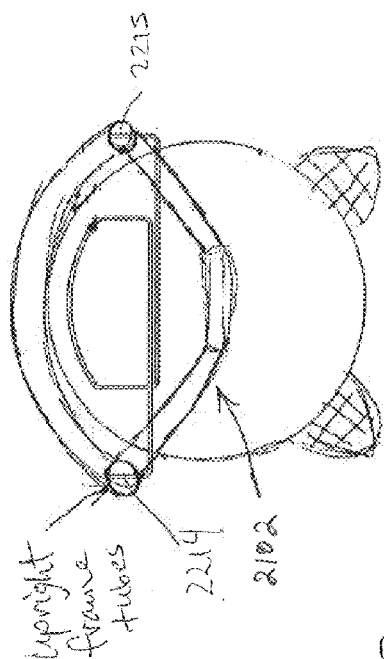
Fig. 22e
Fig. 22d

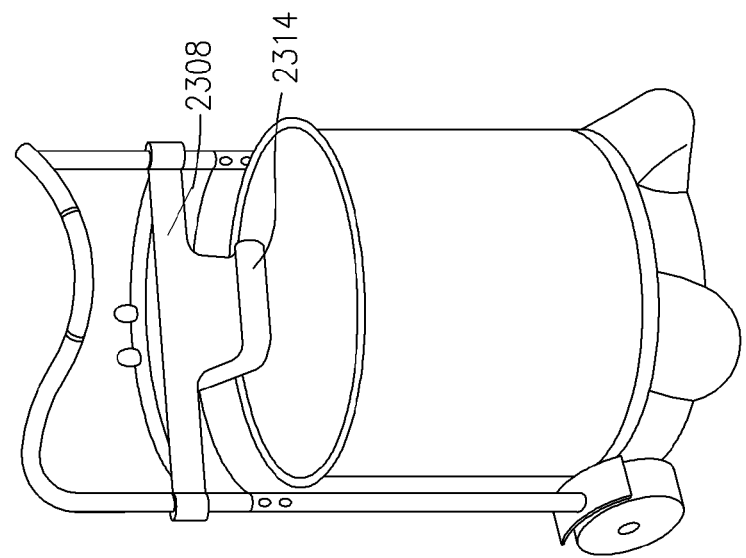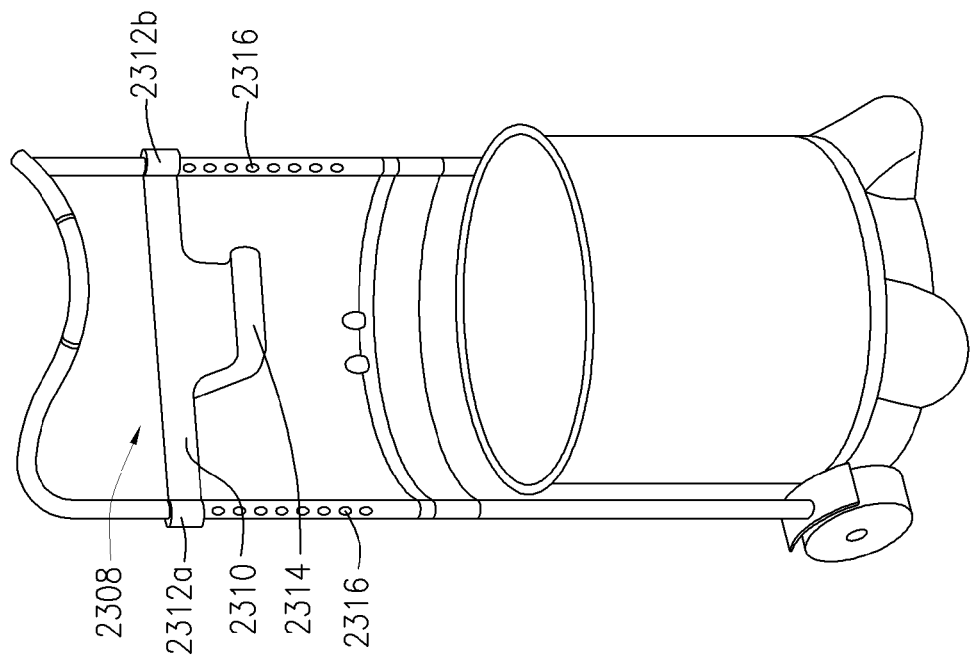

WHEELED CARRIER WITH BRAKES

CROSS-REFERENCE TO RELATED APPLICATIONS

The present application is a continuation-in-part of application Ser. No. 12/322,972 filed Feb. 9, 2009 entitled WHEELED CONTAINER CARRIER, which claims the benefit and priority of U.S. Provisional patent application Ser. No. 61/026,867, filed Feb. 7, 2008 entitled BUCKET AND TANK CARRIER, the entire disclosures of which are incorporated herein by reference.

FIELD OF THE INVENTION

This invention relates to article carriers and particularly to article carriers for 5 gallon buckets and consumer propane gas cylinders or tanks.

Literally hundreds of products used in our daily lives are sold in standardized containers such as 5 gallon buckets. Standard 5 gallon buckets have standardized size dimensions of about 10.5" base diameter, and a height of about 14.5". Propane gas cylinders are also standardized in sizes (designated as pounds) such as sold as #20 (5 gal.), #30 (7 gal.) and #40 (10 gal.), all of which have about 12.25" diameters and one inch high bases of about 7 and ¾" diameter (larger capacities differ in greater cylinder height). The current industry standard requires the consumer to lift and carry 5 gallon buckets using only the handle provided by the bucket manufacturer or by the integral metal collars of the propane cylinders.

SUMMARY OF THE INVENTION

It is accordingly an object of the present invention to provide lightweight, wheeled carriers with minimal stored volume but with very high transport weight capacity for standardized size containers.

It is a further object of the present invention to facilitate lifting of the containers on the wheeled carriers and to provide an integrated moving skid.

In accordance with the present invention, wheeled carriers designated herein as "Bucket Buggy" for transport of 5 gallon buckets consumers are able to easily transport, and permit lifting and use of products that are sold in 5 gallon-size buckets without strenuous effort normally required. A second carrier embodiment, within the scope of the present invention is adapted for use with tanks such as standard propane gas cylinders or tanks and is designated herein as "Tank Trolley".

Generally the present invention comprises a wheeled carrier for containers comprising: a) two wheels; b) an elongated axle member connecting the wheels; c) a handle member configured for enabling a user to move or lift the wheeled carrier, with the axle being engaged with the handle member, and d) a container support member integral with the axle member. The container support member is either a separate element configured to support a container in a position directly on the axle member with the axle member directly supporting substantially the full weight of the container or it is the axle member, itself. With the weight being supported directly on the axle, a small folded storable carrier with approximate dimensions of about 3" wheel thickness by about 16" height by about 12" width (excluding wheels), is capable of safely transporting up to about 160 pounds of load. The wheels can be 5½" and the overall height, 24". Other dimensions are possible.

BRIEF DESCRIPTION OF THE DRAWINGS

The above and other objects, features, and advantages of the present invention will become more evident from the following discussion and drawings in which:

FIG. 3b is a side view of the folded bucket carrier of FIG. 3a;

FIGS. 12a and 12b depict open and closed conditions respectively of the handle pin retaining lock;

FIGS. 21a-25b illustrate various restraining clips for securely holding a container or a gas canister to the bucket carriers of the present invention.

DETAILED DESCRIPTION OF THE INVENTION AND DRAWINGS

Figure 5:
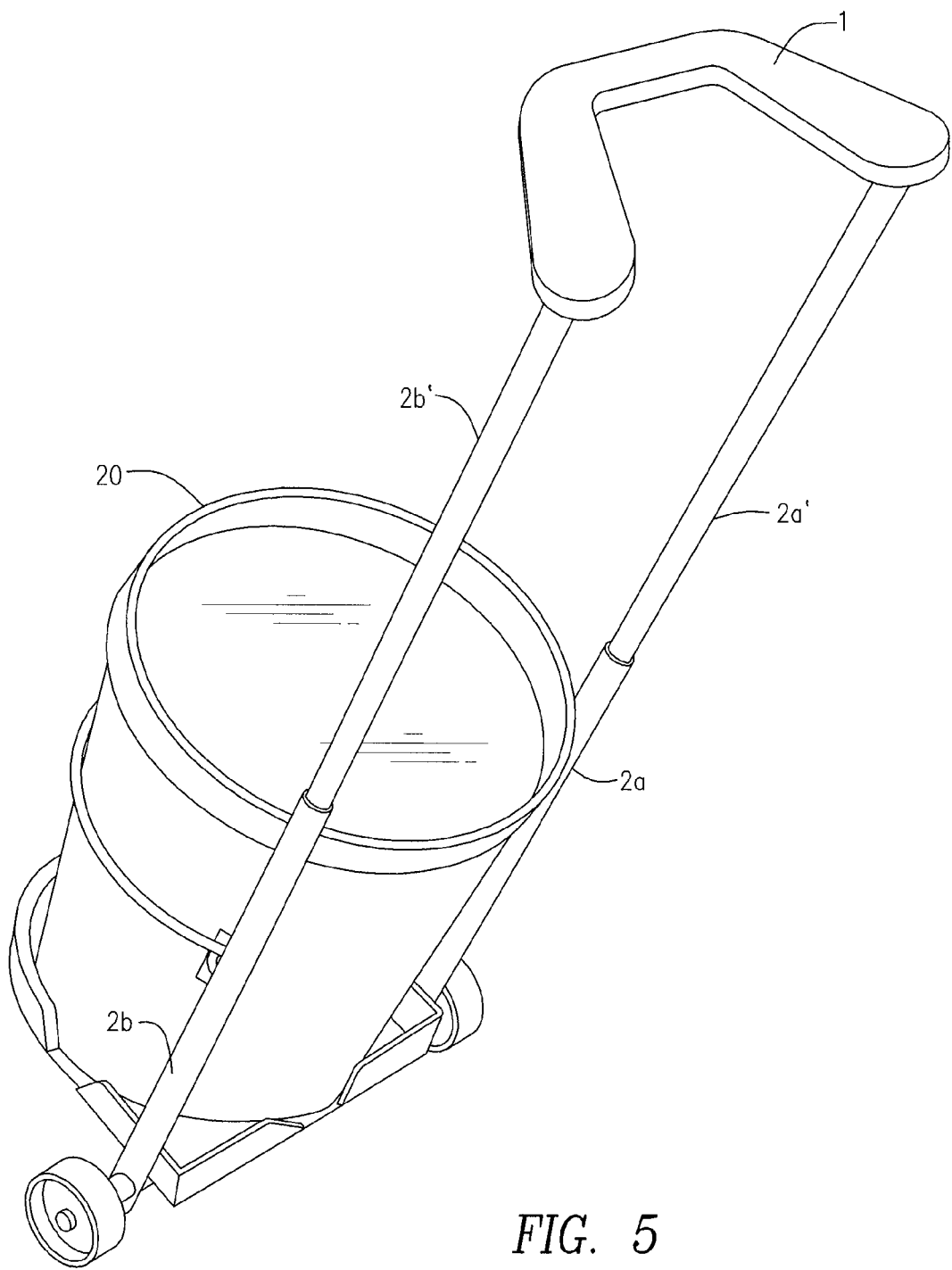
FIG. 5 shows a mode of the bucket being transported in the carrier.
Figure 6:
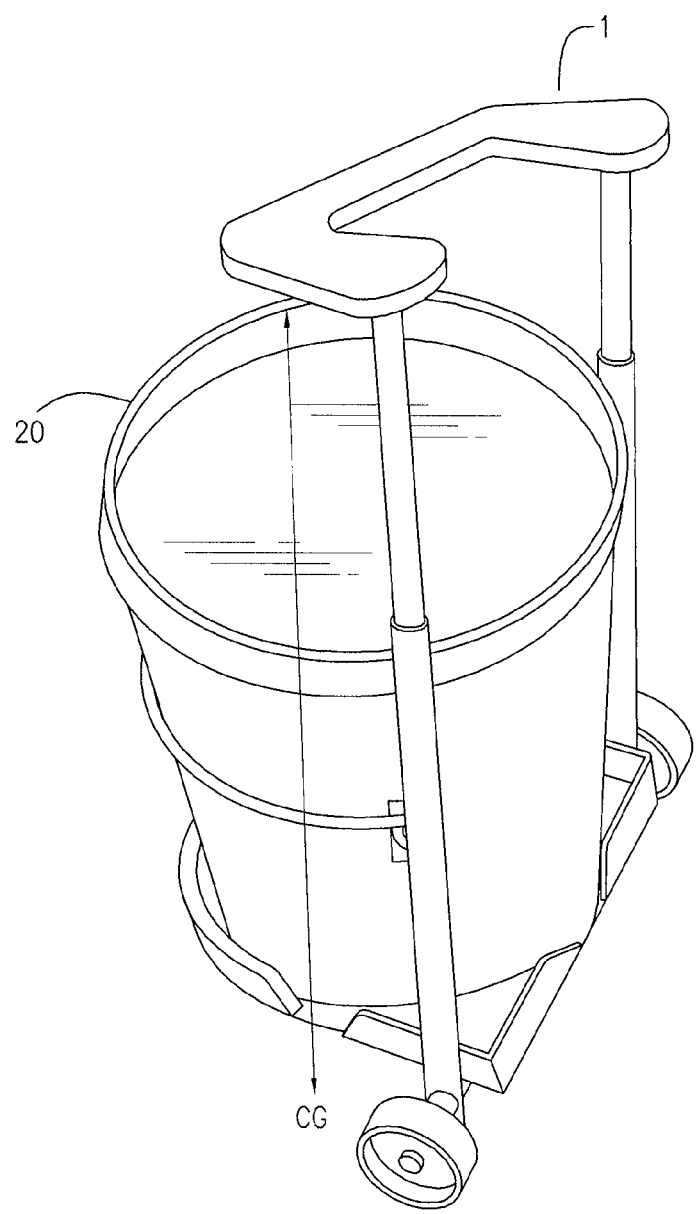
FIG. 6 shows a mode the bucket being lifted by hand while in the carrier.
Figure 7:
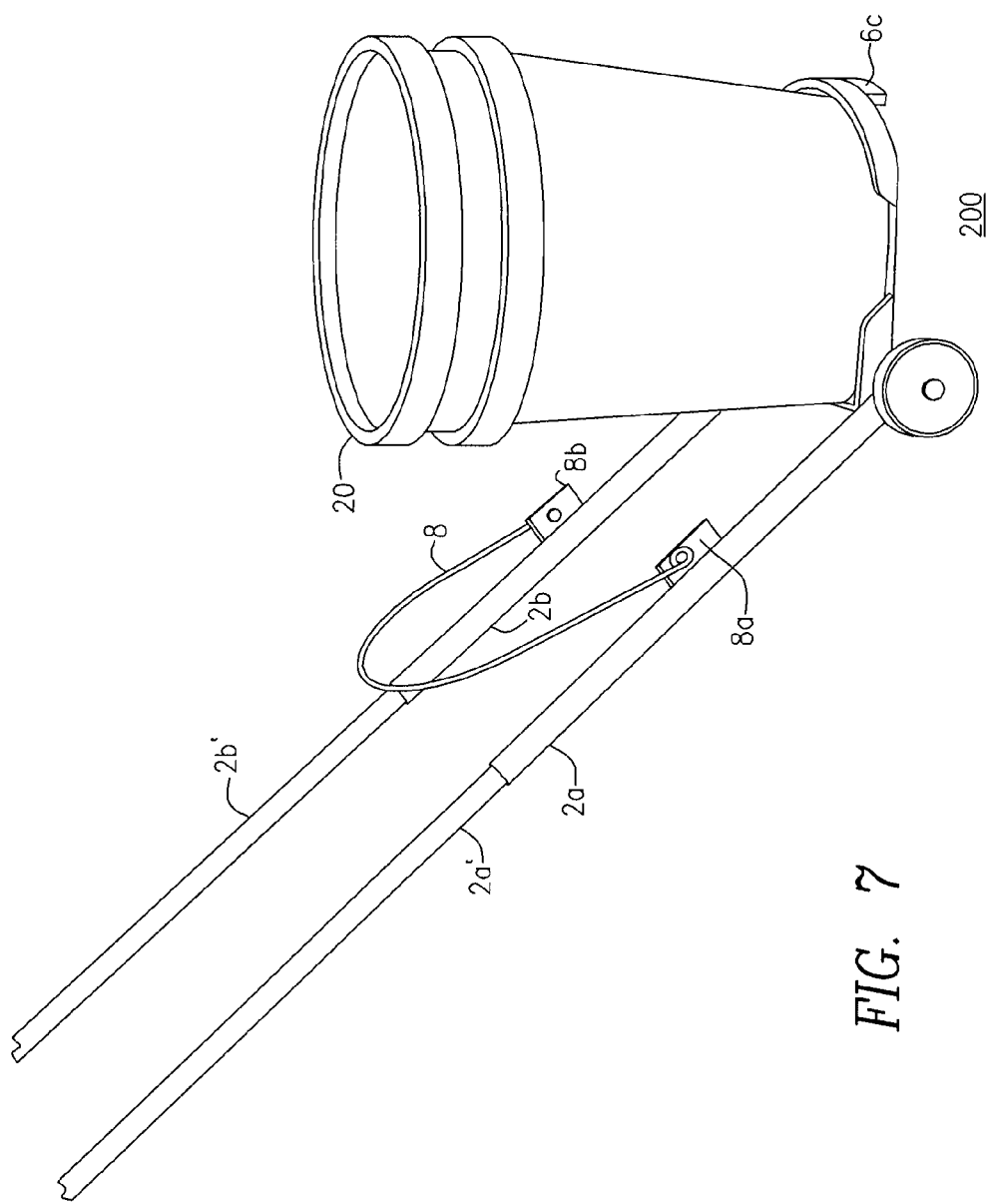
FIG. 7 shows a mode of the bucket carrier being used as a skid for the bucket.

With the Bucket Buggy container carrier 10, the consumer simply slips the bucket 20 into position, and now the heavy bucket can be wheeled rather than carried, as shown in the embodiment shown in FIGS. 1-7. The carrier 10 comprises 3" wheels 3a and 3b, connected by axle or axle member 5, more clearly seen in FIG. 3a. Telescoping rods or struts 2a and 2b with respective telescoping rods or extension elements 2a' and 2b', connect the axle 5 to handle grip 1 to constitute the drive handle for the carrier. Struts 2a and 2b are spaced sufficiently close together to positionally support the peripheral sides of bucket 20. Bucket 20 rests directly on a container support member 6a, which in turn rests directly on the axle 5 (i.e., weight placed on support member 6a is actually entirely supported by the axle). As more clearly seen in FIGS. 2-7, support member 6a is provided with a foldable stabilizing extension platform 6b which stabilizes a bucket 20 from tipping over, in conjunction with bucket retaining hoop 8 (shown deployed in FIGS. 4-6). Extension 6b has a stabilizing foot 6c which keeps bucket 20 parallel to the ground 200, as shown in FIG. 7, when the carrier functions as a moving skid. In such latter operative embodiment, retaining hoop is swiveled away from engagement with the bucket 20 via swivel elements 8a (FIG. 7).

When transferring the bucket into a car, or whenever lifting is required, the telescoping handle 1 positively locks into position over the center of gravity (line CG) as shown in FIG. 6, becoming a safe and comfortable handle for one-handed or two-handed lifting.

Figure 1:
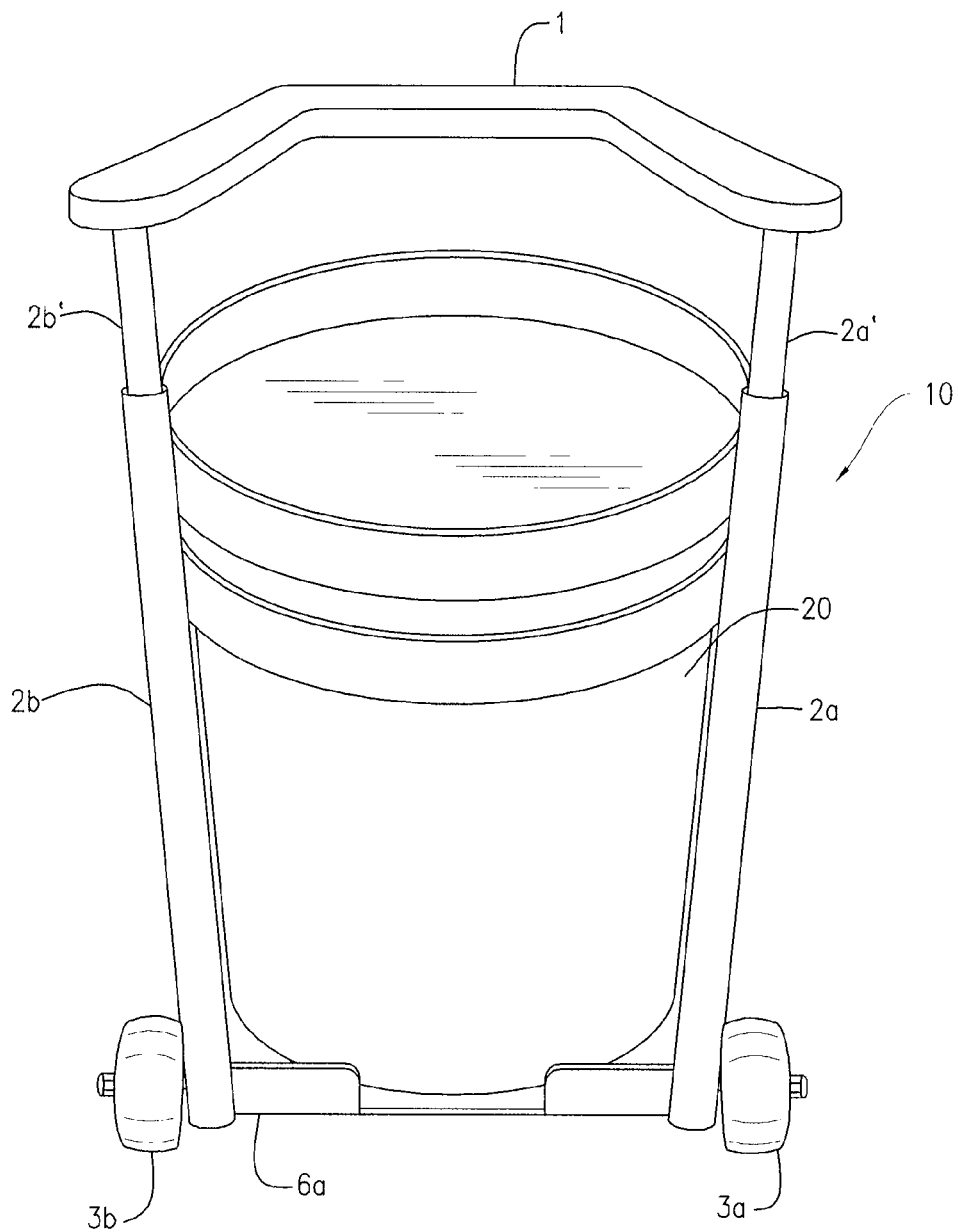
FIG. 1 is a rear view of a bucket carrier embodiment of the present invention with a bucket placed thereon.
Figure 2:
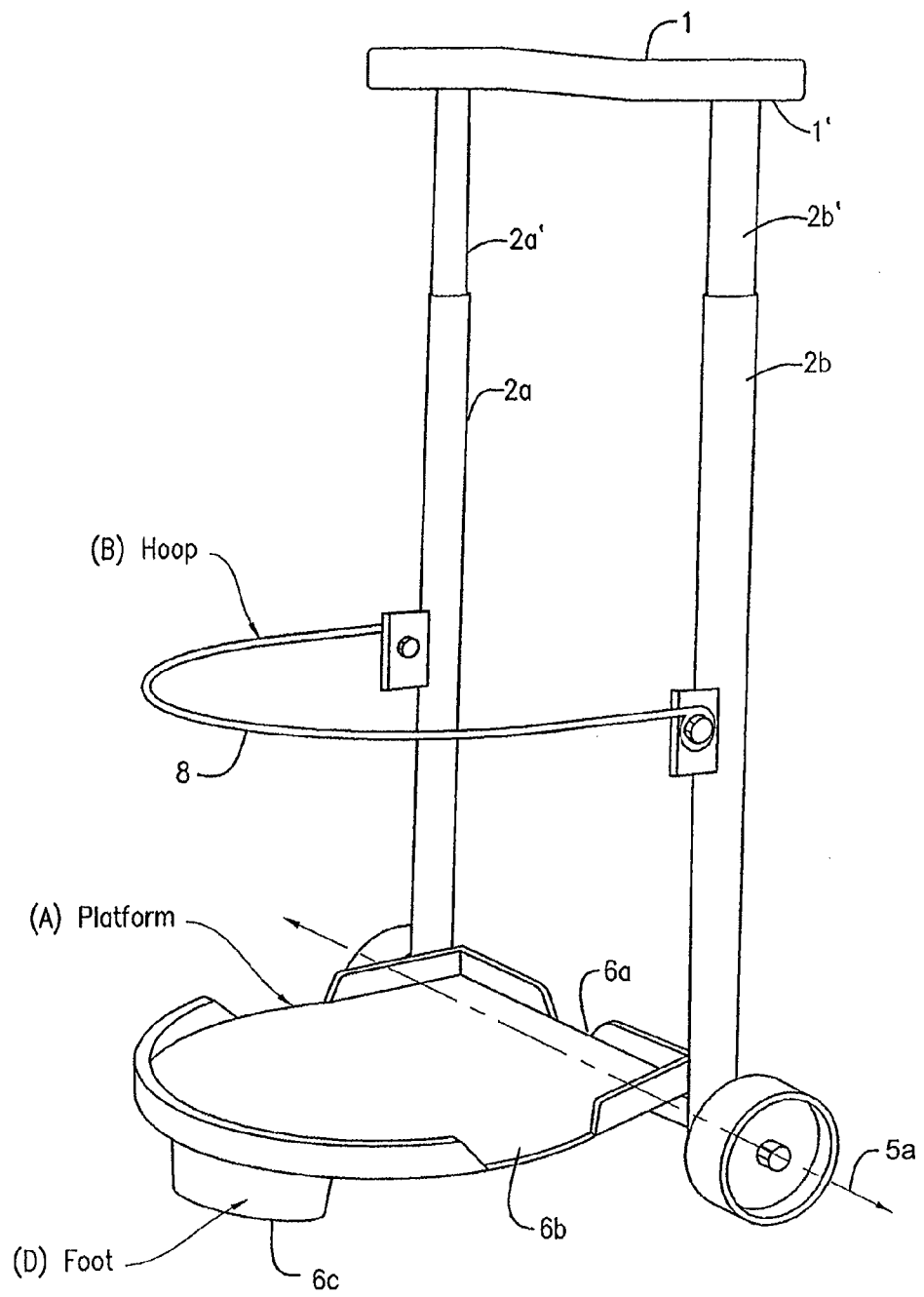
FIG. 2 is a perspective view of the bucket carrier of FIG. 1, without the bucket.

The platform 6b and hoop 8 of the Bucket Buggy in FIG. 2 are customized to the exact size and shape of a standard 5 gallon bucket, to keep the bucket securely in position during transport. However, it is important to note that this carrier and platform is not a hand truck, because the platform 6b does not support the weight of the bucket 20 as do cantilevered platforms of hand trucks. With the Bucket Buggy carrier, the weight of the bucket rests completely on the axle 5 and not on the platform. With this design, the carrier can be made very light-weight and collapsible. With proper retaining element such as tightenable straps (not shown) taking the place of hoop 8, even support member 6a can be dispensed with, with the bucket resting directly on axle 5.

The purpose of the platform 6b in the present carrier structure is only to hold the bottom of the bucket in position, preventing lateral motion during transport, and to provide a foot 6c that holds the bucket level when sitting flat. The platform 6b may accordingly be shortened or eliminated entirely with the use of a retaining element such as a strap (for example with a releasable locking member or a hook and eye fabric fastener).

Figure 3A:
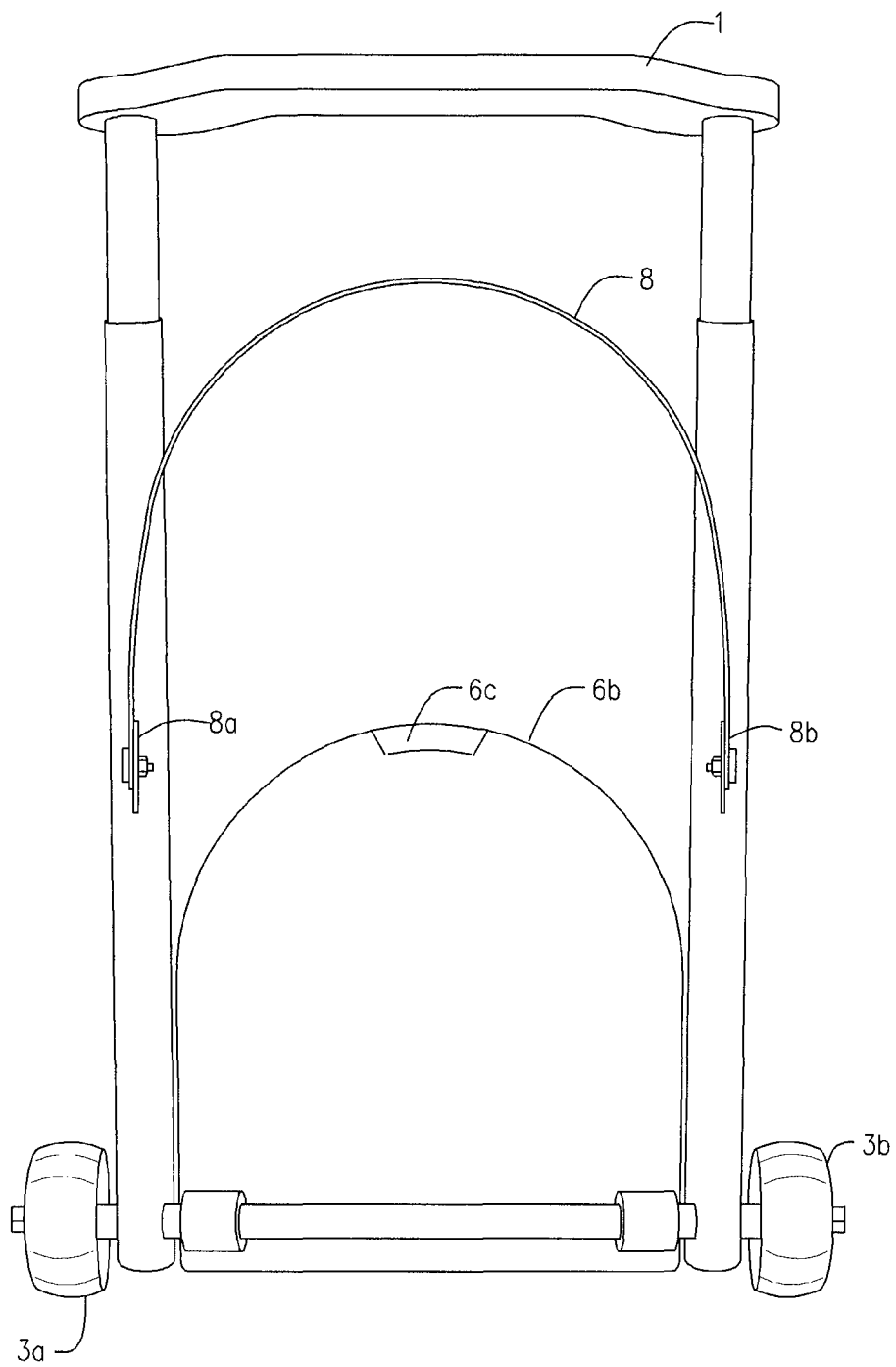
FIG. 3a is a rear view of the bucket carrier of FIG. 2 in a folded configuration.
Figure 3B:
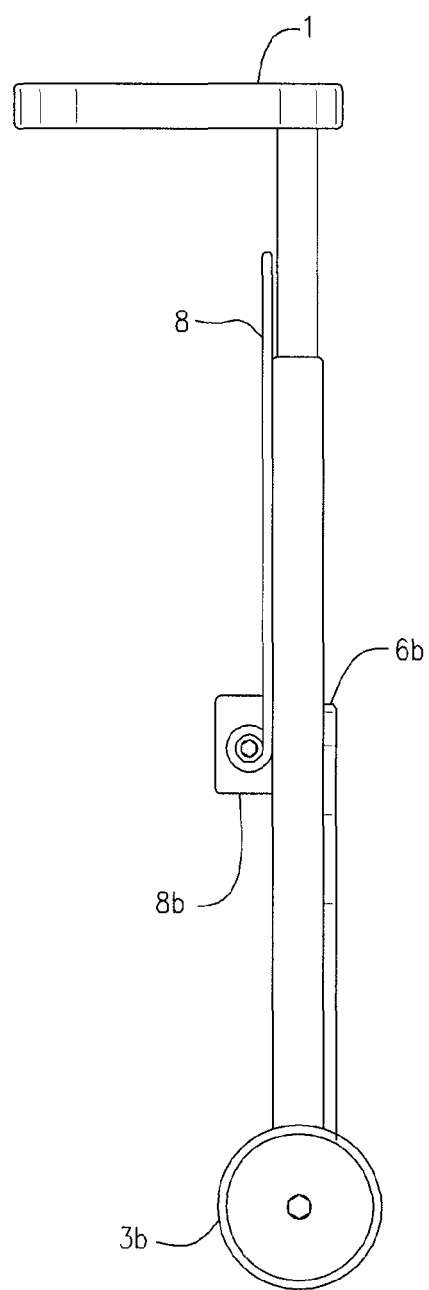

The Bucket Buggy carrier 10 folds into a flat, compact form for easy storage as shown in FIGS. 3a and 3b. Connection of gripping handle 1 with telescoping extension rods 2a' and 2b' may be made with a 3-way locking position connection (not shown) wherein the gripping curvature can be placed over the bucket's center of gravity (FIG. 6) or 180° away therefrom for facilitated pulling or pushing. The third position is in direct line with the rods 2a' and 2b' to further reduce the storage profile shown in FIGS. 3a and 3b. In FIG. 2, the wheels 3a, 3b are shown to be rotatable around axis 5a The consumer can readily keep carrier 10 on hand in his or her car (with minimal weight and storage space) so that it is conveniently available whenever needed. Retailers can keep a rack of them on display at the points of purchase for all of their products sold in 5 gallon buckets.

Figure 4:
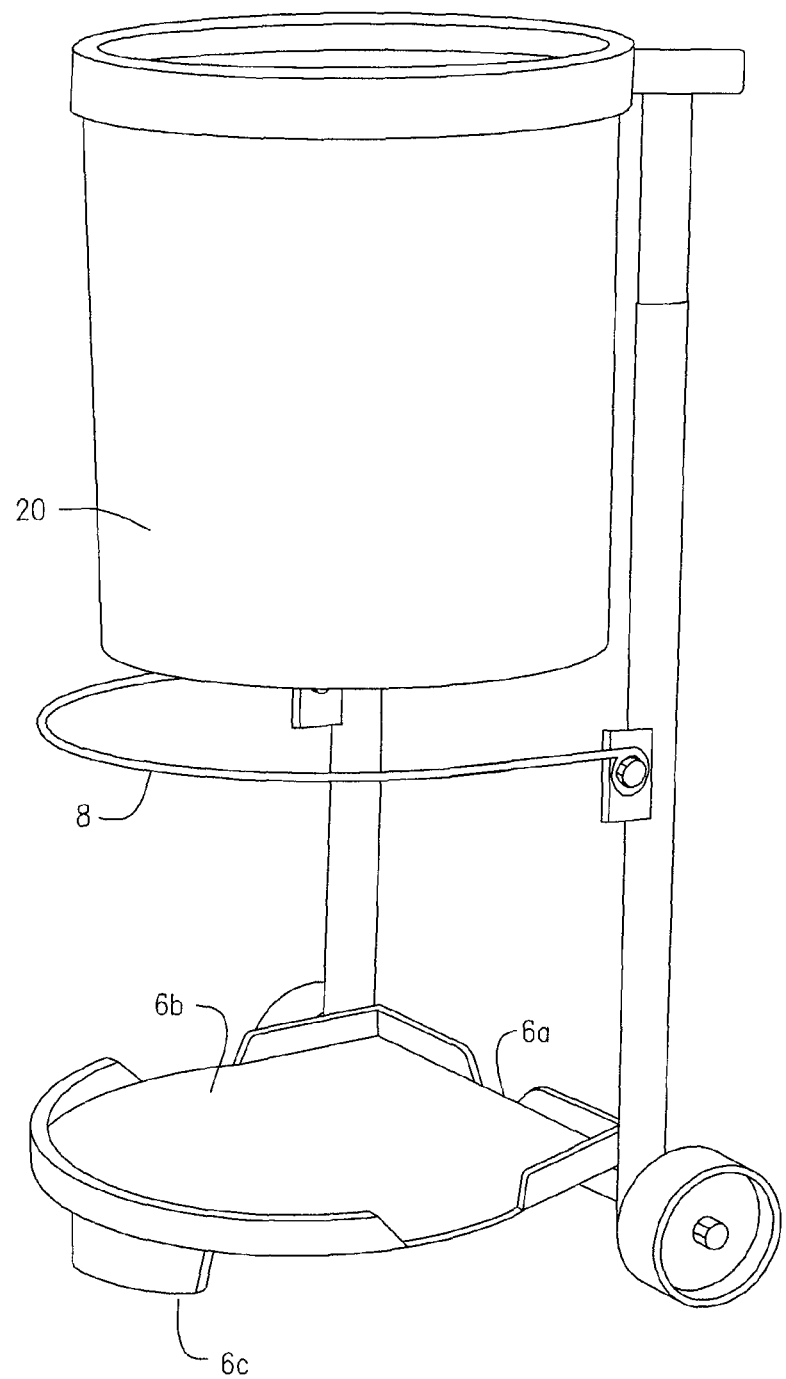
FIG. 4 depicts a bucket being placed in the bucket carrier of FIG. 2.

To initiate use of the Bucket Buggy carrier 10, the platform 6b and hoop 8 are simply folded down and the telescoping handle 1 lifted. Bucket 20 is then placed into position as shown in FIG. 4. The hoop 8 holds the bucket securely against the strut bars 2a and 2b and the weight of the bucket 20 rides on the axle 5 as shown in FIG. 5.

In use, the handle 1 is tilted and the bucket will roll easily over virtually any surface.

To lift the bucket 20 using the Bucket Buggy carrier 10, just slide the telescoping handle 1 down into the lowest position. The handle 1 will lock into position and is designed to align perfectly with the bucket's center of gravity CG. This keeps the bucket and its contents level during lifting, as shown in FIG. 6. The curvature of the handle makes it easy to lift the bucket with either one hand or with both hands.

It is possible to use the Bucket Buggy carrier to transport stacked buckets with modification of the curvature of the handle to permit placement of a second bucket and an additional holding element such as a second strap. Alternatively, a second full or partial platform may be provided for the second bucket.

Often, when using a product contained in a 5-gallon bucket, the user is required to move the bucket from place to place while using the product. For example, when painting a wall, resurfacing a driveway, dispersing ice melt salt or sand, applying grout or adhesive over a floor, spreading grass seed or fertilizer—all these jobs require the user to move the bucket from one position to another repeatedly.

With this in mind, the Bucket Buggy carrier is optionally designed to easily become a skid as shown in FIG. 7. To use the Bucket Buggy carrier 10 as a skid, simply detach one end of the hoop 8 from swivel element 8a and fold the hoop up as shown, so that it is no longer supporting the bucket. The handle 1 is then free to tilt backward and forward freely, and the wheels 3a and 3b and foot 6c of the platform form a skid that can be easily rolled in any direction, into any convenient position, without ever having to lift the heavy bucket. Alternatively, one can swing the hoop upward and tilt the handle back.

Tank Trolley Embodiment

Figure 8:
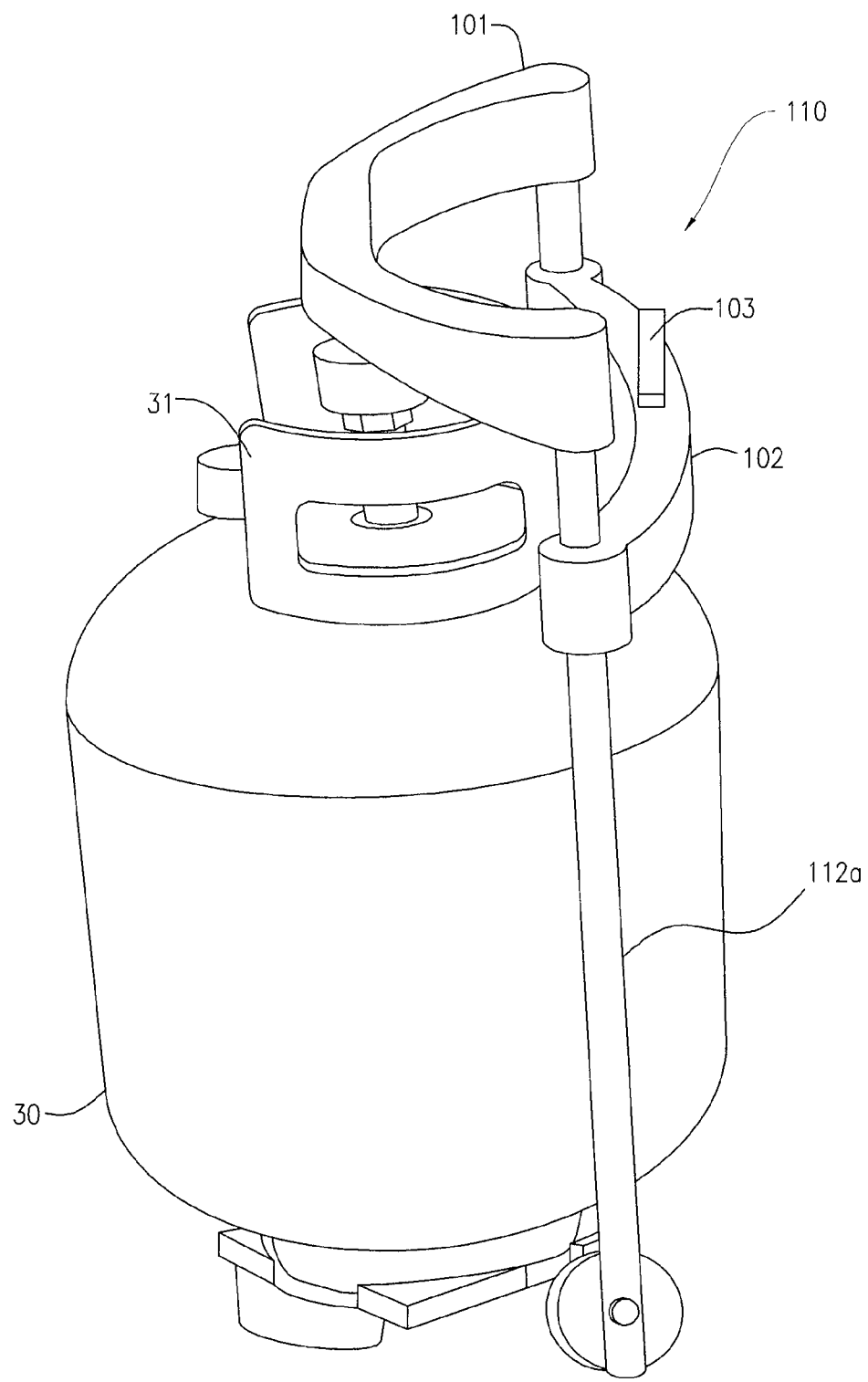
FIG. 8 is a side view of a propane gas tank carrier embodiment with a propane tank placed thereon.

In another embodiment of the carrier of the present invention the Tank Trolley embodiment 110, shown in FIGS. 8-16, is one especially useful variation on the Bucket Buggy carrier that is specifically designed to accommodate liquid propane gas (ALPG@) cylinders or tanks 30 shown in FIG. 8. Similar to the Bucket Buggy carrier of FIGS. 1-7, which is designed for and which works for 5 gallon buckets, the Tank Trolley carrier 110 enables consumers to easily transport, lift and use 20-pound (#20) and 30-pound (#30) and even 40-pound (#40) propane tanks 30 without the normally required strenuous effort.

Figure 9:
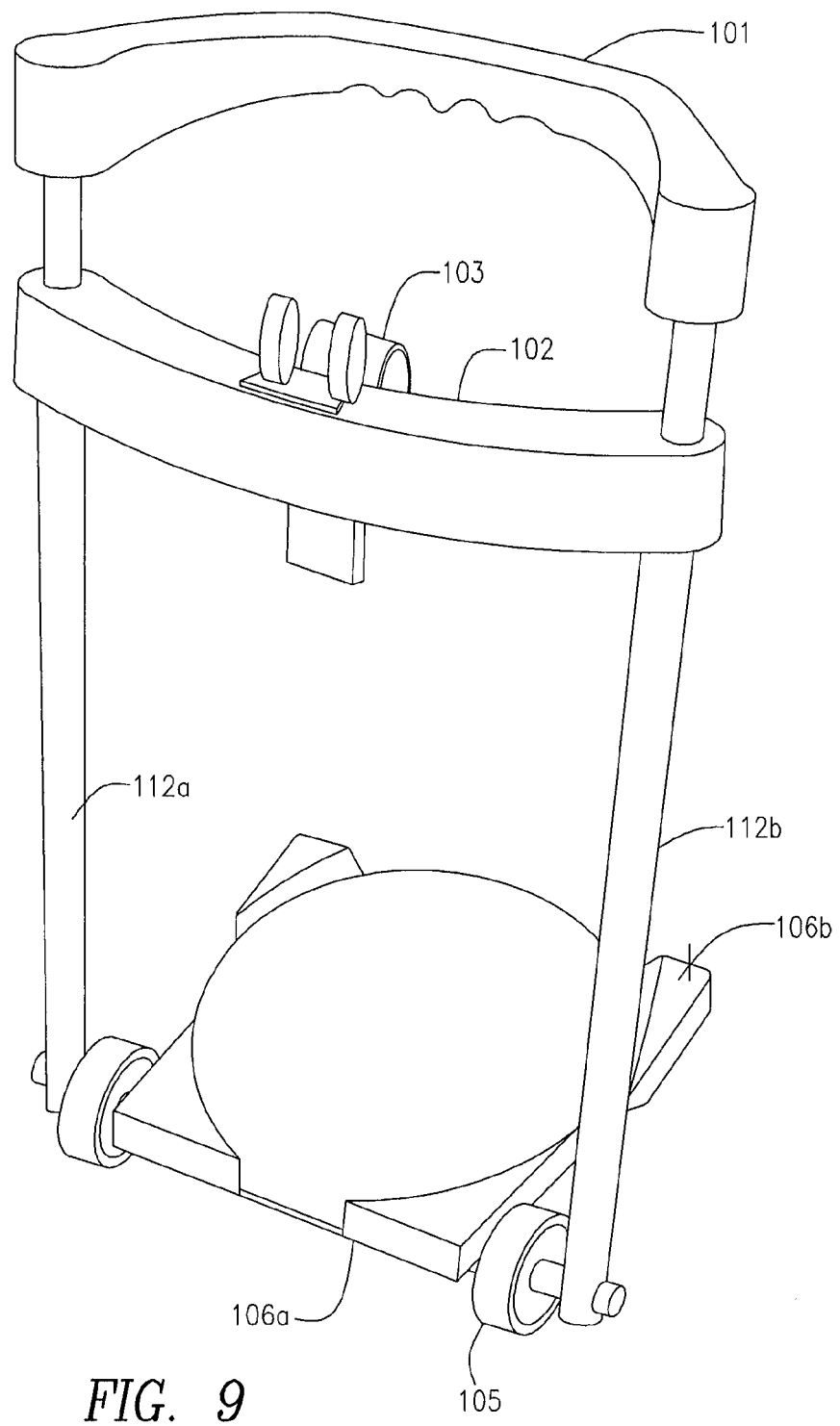
FIG. 9 is an isometric rear view of the propane gas tank carrier of FIG. 8 without the propane gas tank.

As with the Bucket Buggy carrier, the platform 106b on the Tank Trolley does not support the weight of the tank FIG. 9. All of the weight rests on container support 106a with weight support provided by axle 105. The platform 106b is specially sized and shaped to keep the tank 30 from moving laterally during transport. It also has a foot 106c on the bottom of the platform to keep the tank level when sitting flat.

Figure 10:
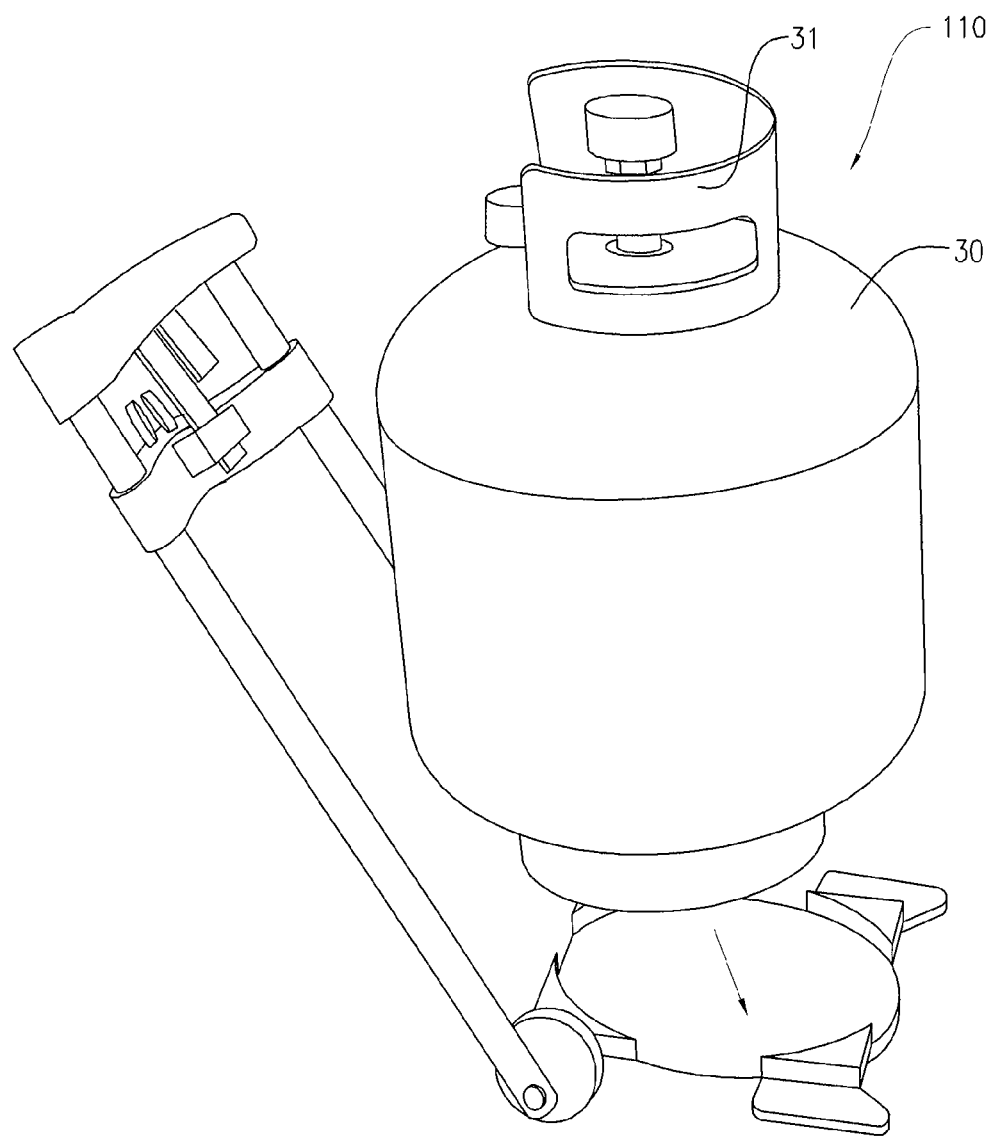
FIG. 10 shows placement of a propane gas tank on the carrier of FIG. 9.

To use the Tank Trolley carrier 110, just place the tank 30 on the platform 106c, and place the handle 101 back into position over the top of the tank as shown in FIG. 10.

Figure 11:
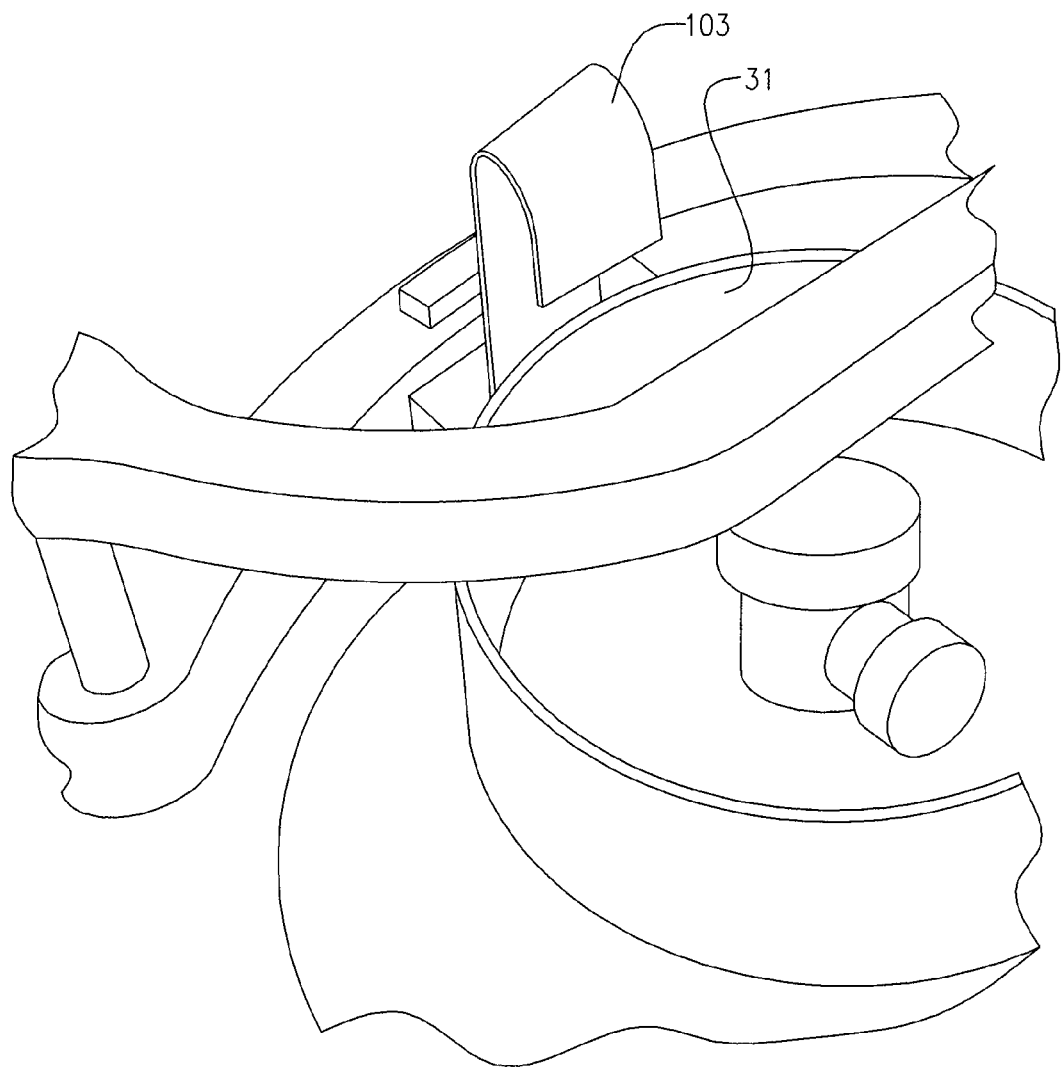
FIG. 11 depicts a holding clip used for retaining the propane gas tank on the carrier.

Because of the configuration of standard propane gas tanks, retaining hoop 8 may be replaced with a retaining clip 103 which positively engages and holds metal collar 31 of standard propane tanks 30. In effecting tank retention onto the carrier 110, the clip 103 (integrated with movable cross bar 102) is made to slide over the lip of the tank collar 31 as shown in FIG. 11. Just as the hoop 8 of the Bucket Buggy carrier holds the bucket in place against the bars, the clip 103 holds the tank securely against the bars 112a and 112b of the Tank Trolley carrier 110. The clip height can be adjusted by vertical movement of cross bar 102, to accommodate 20-pound, 30-pound or 40-pound propane tanks. Because of the placement of collar 31 and valve 33 of propane tanks, stacking of such tanks is not viably possible. Alternatively, the cross bar does not move. Instead, the clip 103 is made with ribs or teeth along its outer perimeter, and the teeth are designed to ratchet inside the receptacle into which it slides, which is attached to the inside at the fixed cross diameter. See FIGS. 10 and 11.

Figure 12:
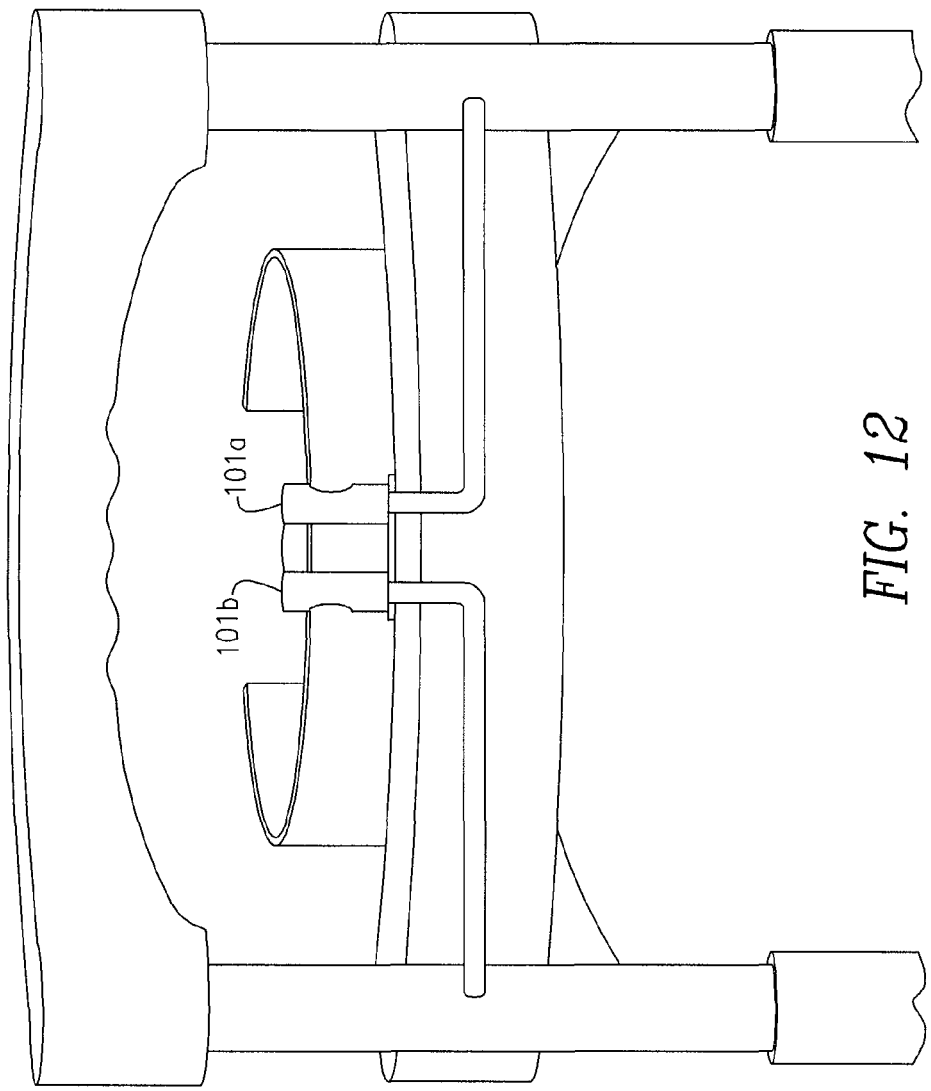
FIG. 12 is a cutaway view showing a handle pin retaining lock for the propane gas tank carrier.

The handle 101 of the Tank Trolley positively locks into a vertical position with a pair of spring-loaded pins 101*a* and 101*b*, as shown in the cutaway view of FIG. 12. This is an important safety feature when lifting or transporting anything heavy, especially something potentially explosive.

Figure 12A:
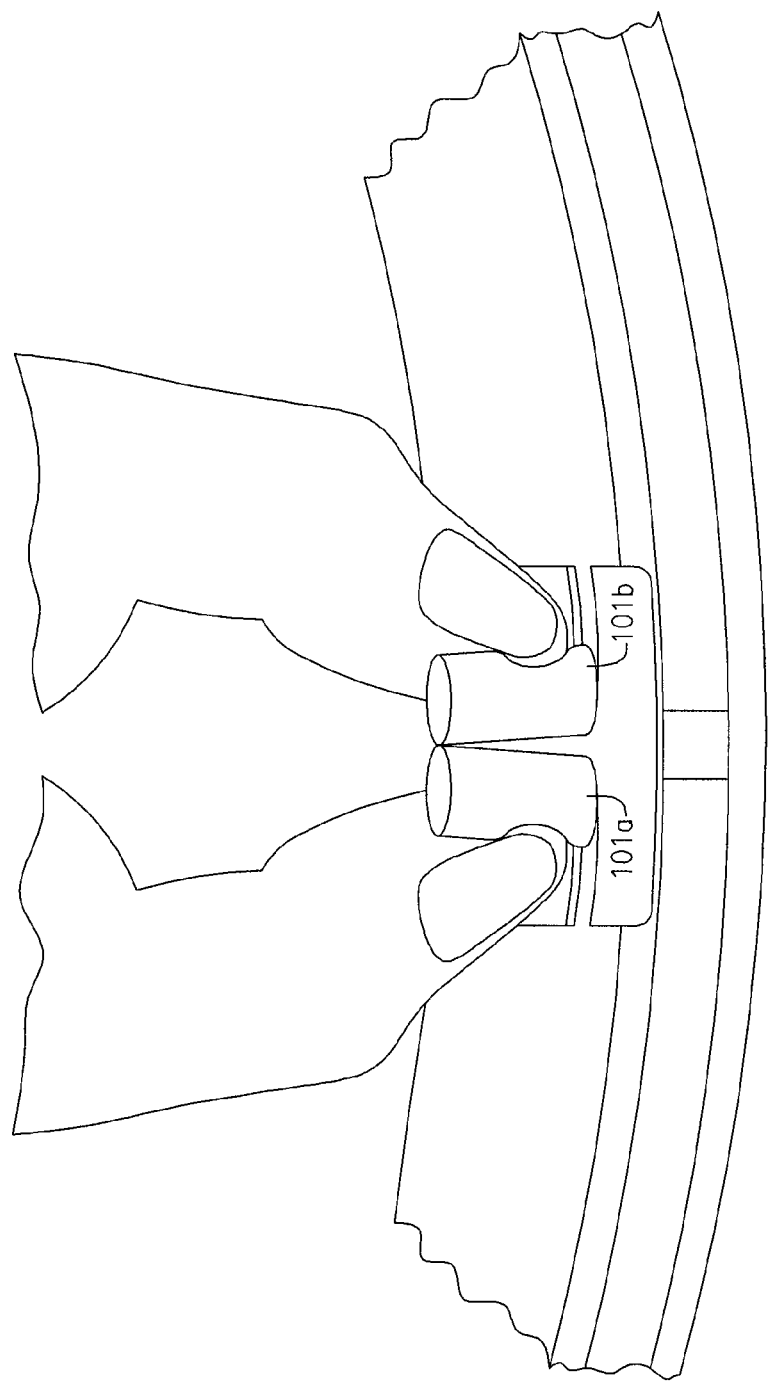

The Tank Trolley carrier handle pin locks 101*a* and 101*b* can be released and engaged with one hand, simply by laterally squeezing or releasing the handle pin locks, as shown in FIGS. 12*a* and 12*b*.

Figure 13:
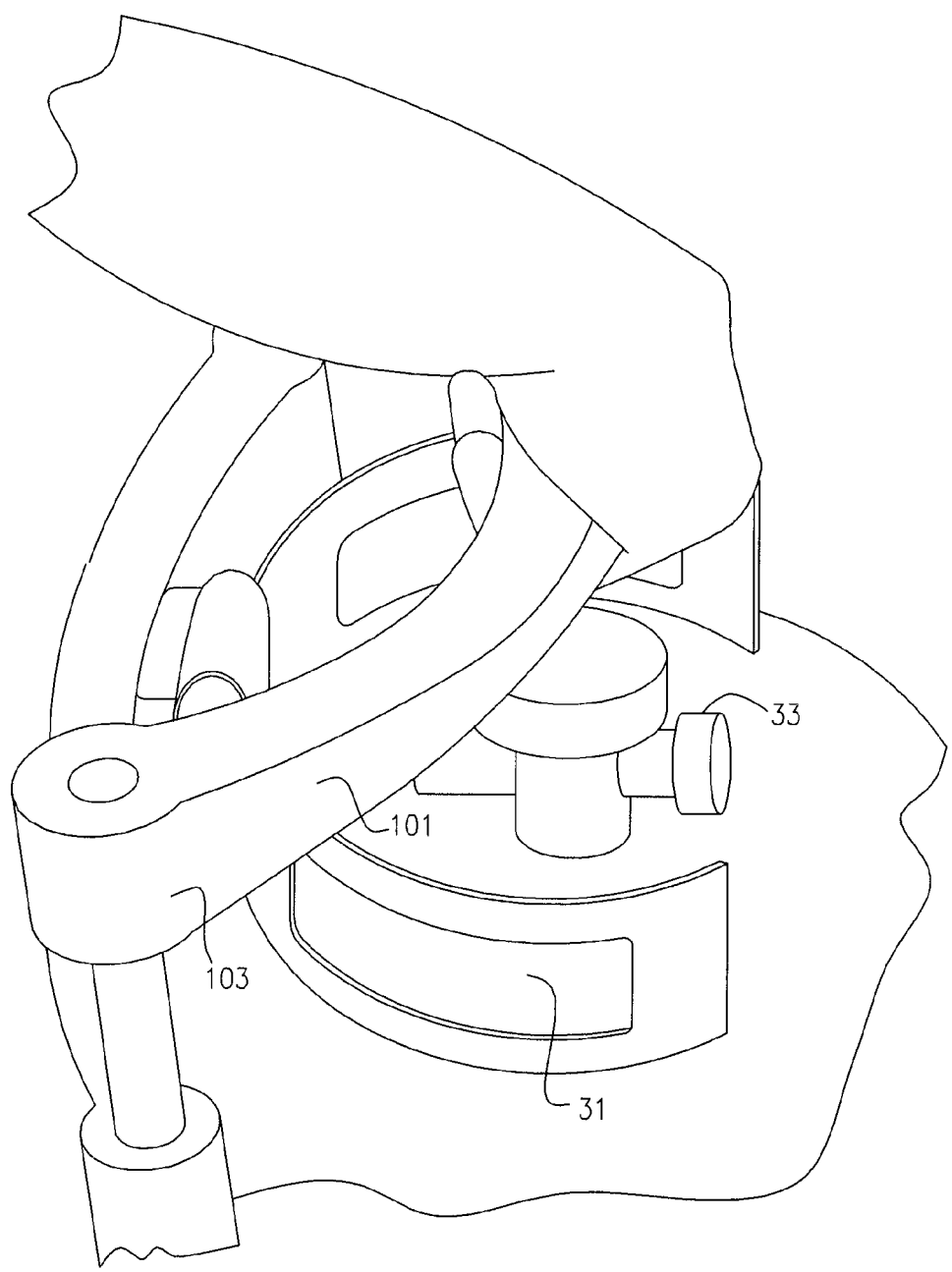
FIG. 13 shows lifting of the handle of the propane gas tank carrier.

To transport the tank using the Tank Trolley carrier, just squeeze the locks 101*a* and 101*b* and pull up on the handle 101, as shown FIG. 13.

Figure 14:
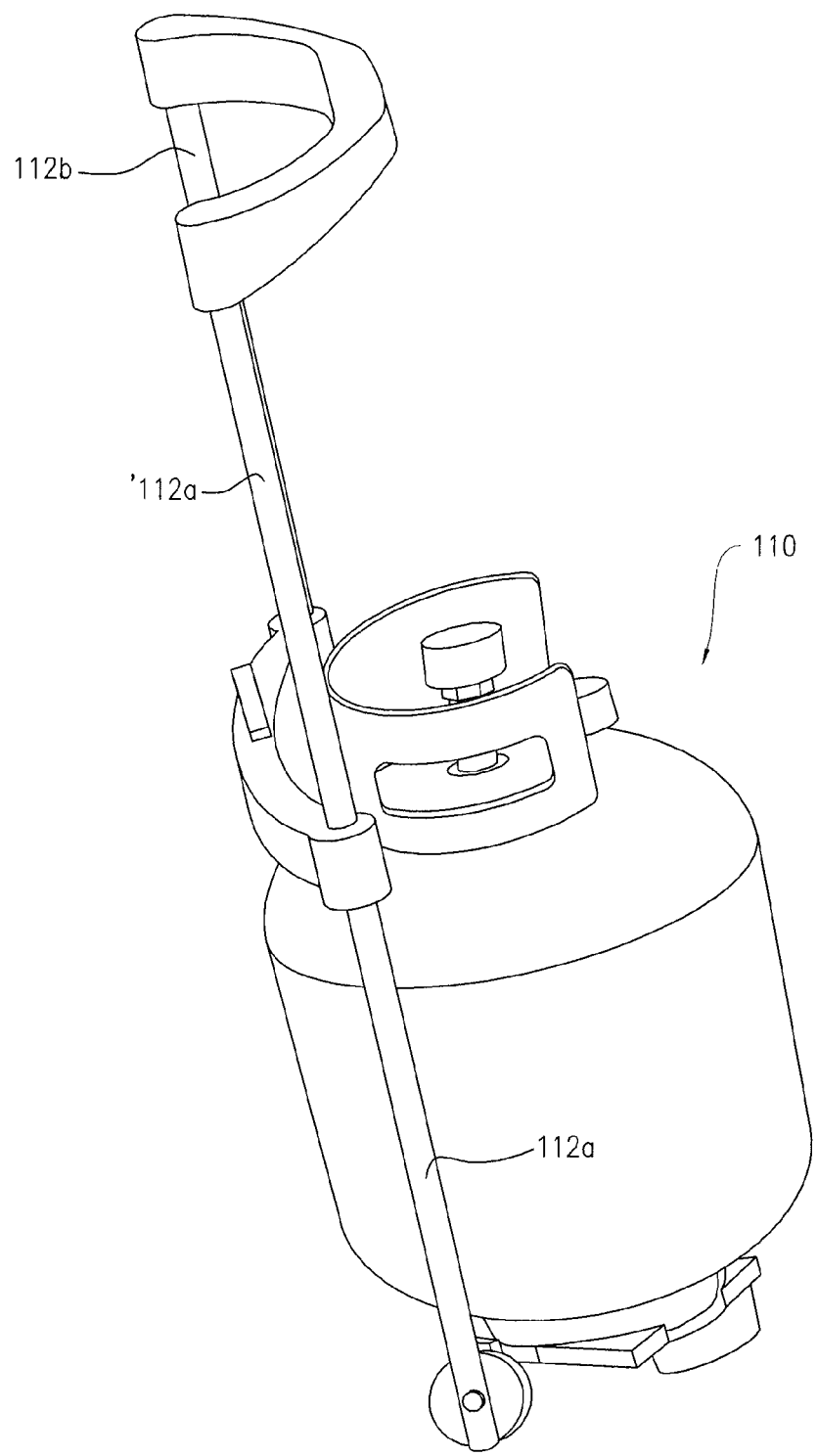
FIG. 14 depicts a transport mode of the propane gas tank.

The telescoping handle 101 is extended to a most comfortable height. The pin locks will engage into the nearest pin location. Handle 101 is then tilted back and the tank 30 can be easily wheeled away, as shown in FIG. 14.

Figure 15:
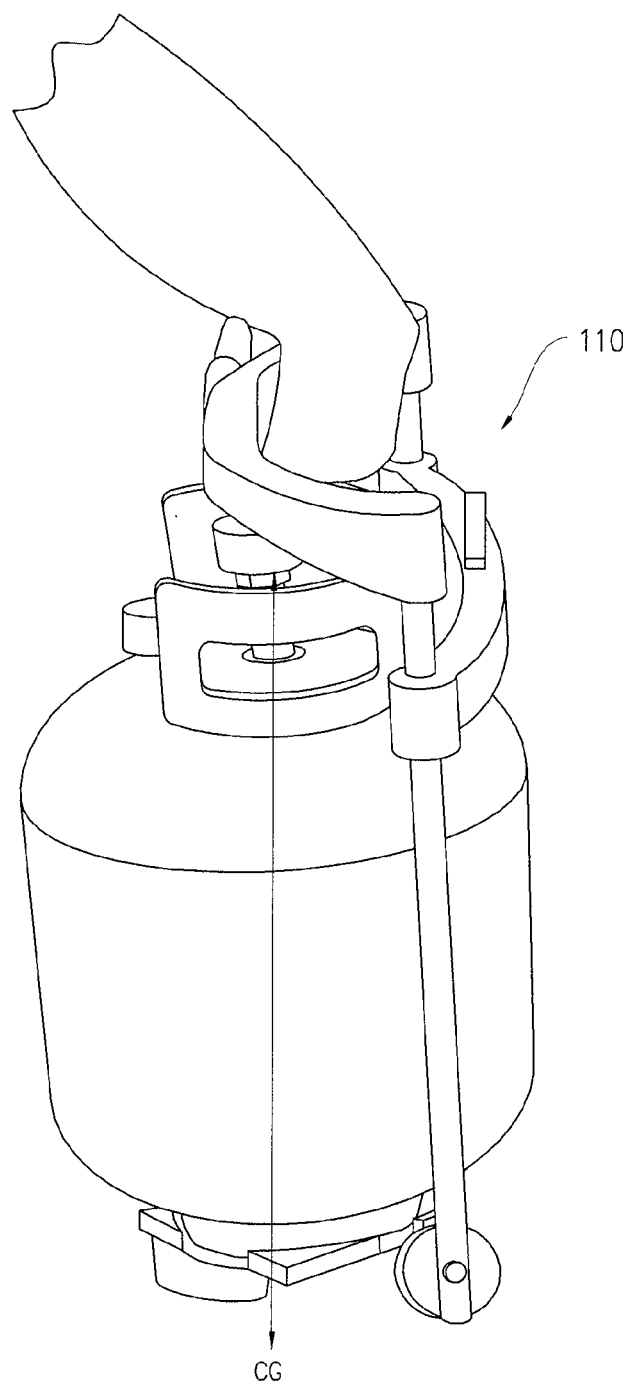
FIG. 15 depicts a lifting mode of the propane gas tank on the carrier.

To use the Tank Trolley carrier as a lifter, release the pin locks and depress the telescoping handle into the lowest position, as shown in FIG. 15. As with the Bucket Buggy carrier, the handle of the Tank Trolley carrier is specially designed to support the tank over its center of gravity for greatest stability.

Figure 16:
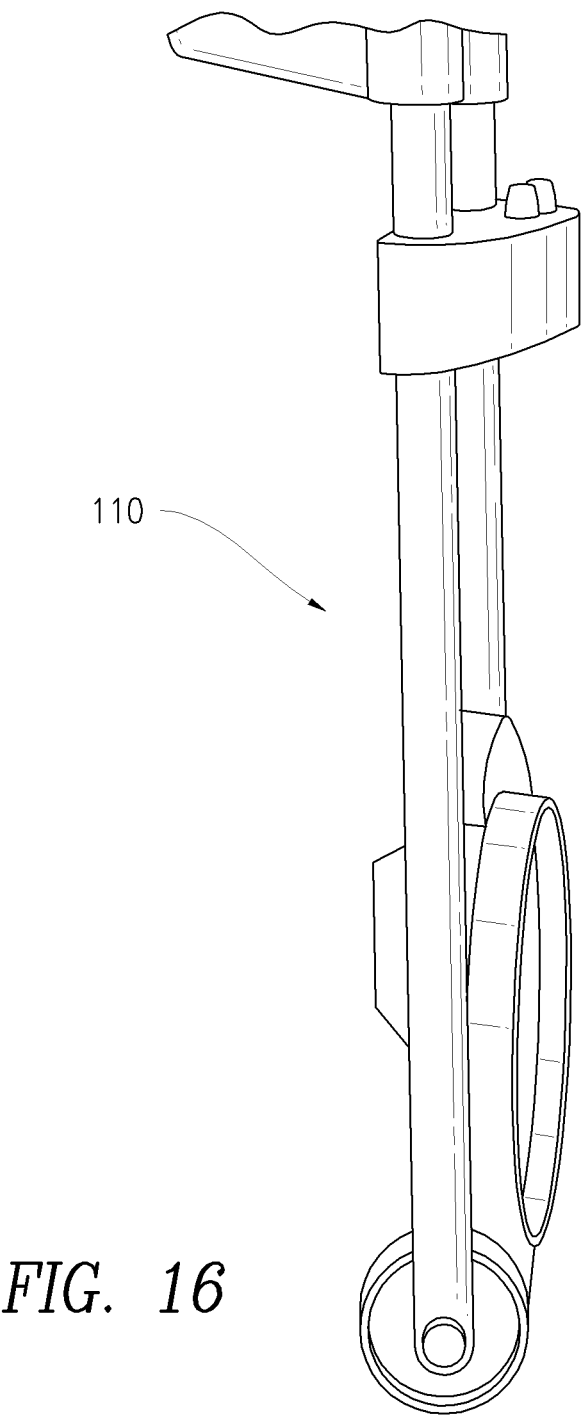
FIG. 16 depicts a storage mode of the tank carrier in a folded configuration.

The Tank Trolley folds flat for easy storage, which, as shown in FIG. 16, and to provide a convenient and economical way for retailers to display it at the point of purchase near their propane tanks.

Trolley Embodiment with Fender-Style Brakes

Figure 17A:
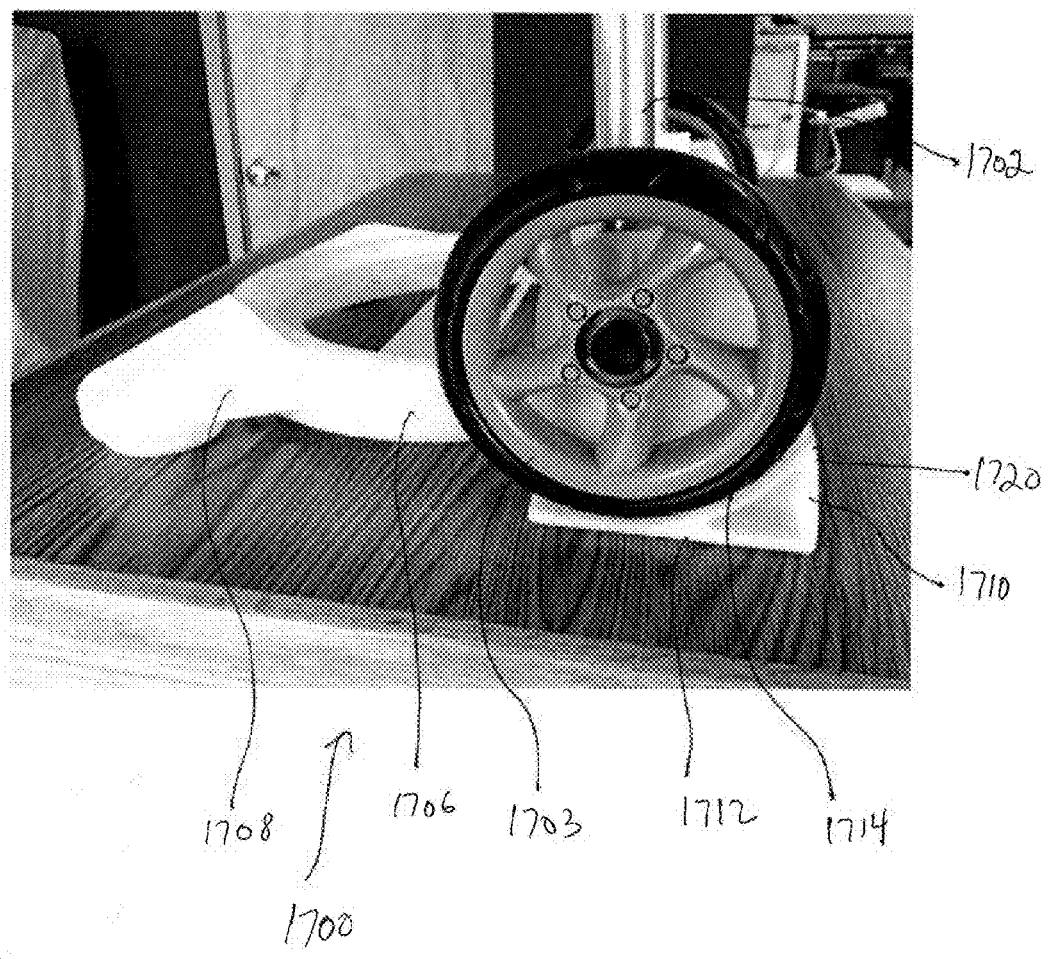
FIGS. 17a through 17c show fender-style brakes for a wheeled carrier 1700 in accordance with a further embodiment.
Figure 17B:
Figure 17C:
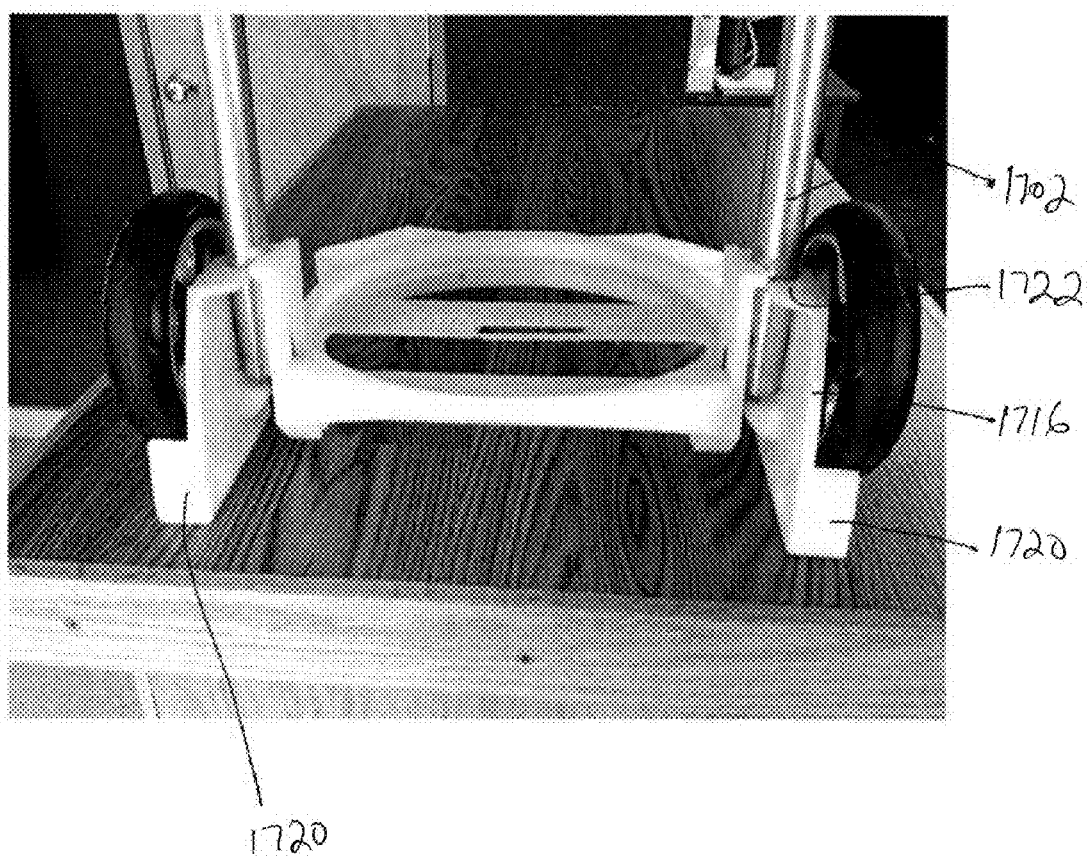

Referring now to FIGS. 17*a* through 17*c*, the trolley 1700 (or carrier) has a container supporting platform 1706, left and right frontally extending legs 1708, a pair of wheels 1703 and an upright support and handle system 1702. In general, the previous description of the trolley depicted in the prior figures is applicable to the trolley 1700 as well.

In the present embodiment, trolley brakes 1710, at the left and right wheels 1703, are pivotable around the axis of the wheels and can be rotated whereby their bottom, flat base surface rests on the floor with the wheels 1703 either facing or (alternatively) bearing against the generally curved inside surface 1714. The rear wall 1720 of the fender brake 1710 can be seen more clearly in FIG. 17*c*, including the rear wall 1720 and the upright wall 1716 of the brake 1710 and the inwardly protruding snap connections 1722 that are able to grab the upright support 1702 (FIG. 17*a*). In the FIG. 17*b* front view, the projection 1718 can be seen, which helps maintain a tighter grip of the platform to the handle system.

Figure 18A:
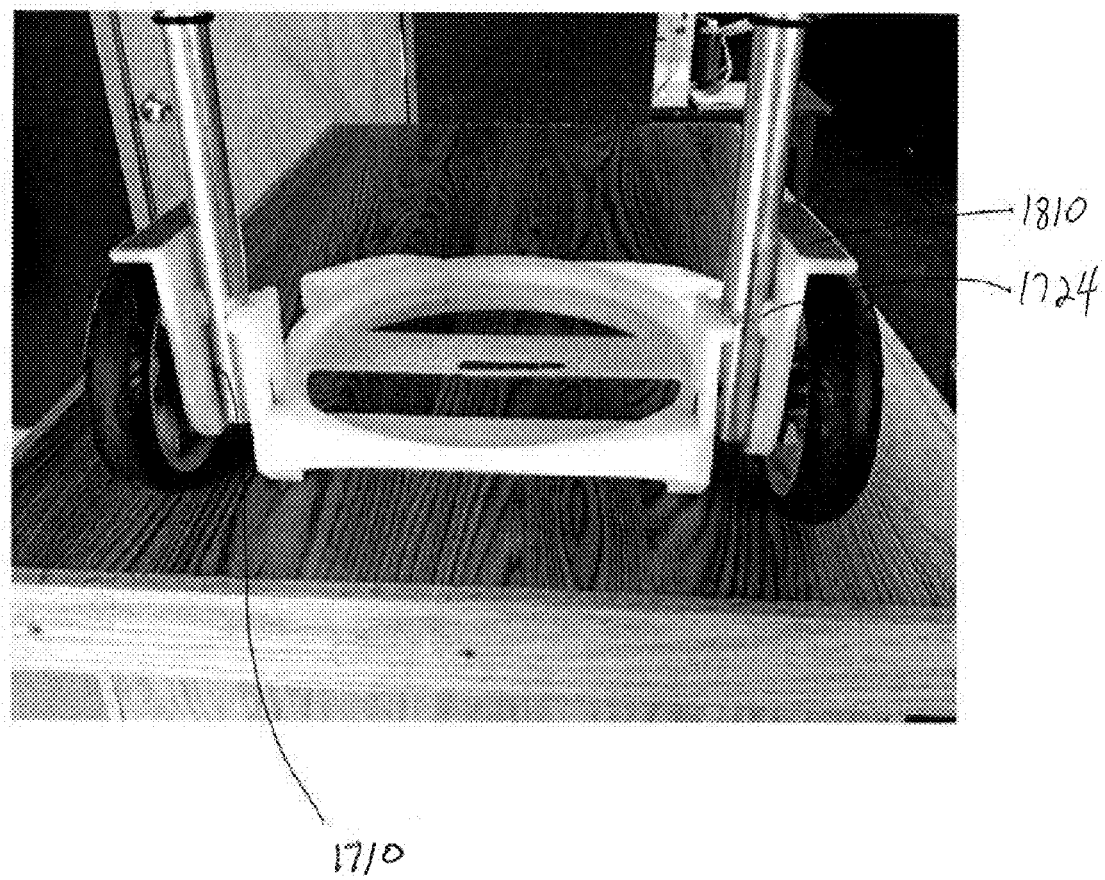
FIGS. 18a and 18b show further details of the fender brakes.
Figure 18B:
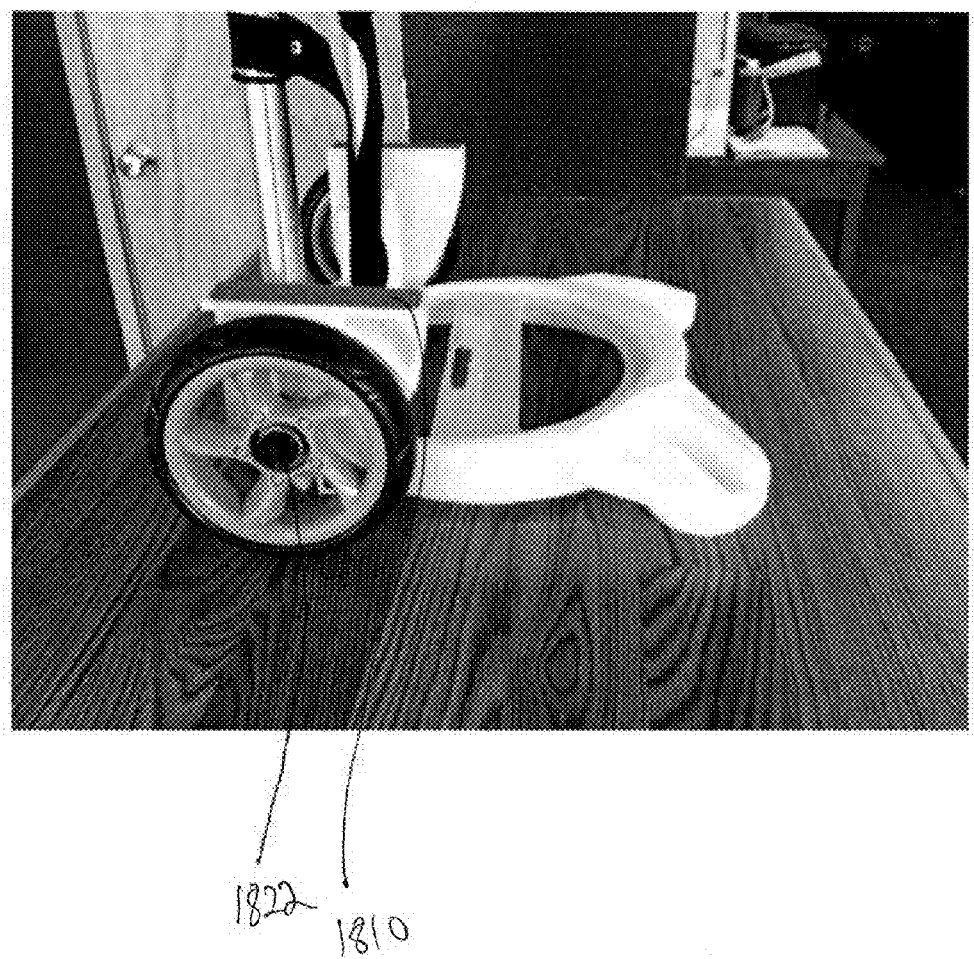

Turning to FIGS. 18*a* and 18*b*, when the fender brakes 1710 are rotated about their axis, which preferably coincides with the wheel axis, they can be turned upside down with their bottom surfaces, which are coated with a roughened layer 1810 now pointing upwardly and allowing the wheels to roll.

As described above, the fender-like brakes rotate about the axle of the carrier, and are held in position by changeably locking into different positions, using the flexibility inherent in plastic materials (like polypropolyne) to do so. Although the fender brakes are preferably made of plastic, they could also be made of metal as well, and coupled/biased with springs to allow engagement and disengagement.

In one embodiment, the brakes lock in the standard "fender-like" position, which allows the unit to roll, by means of a molded "fish-mouth" which flexibly engages the frame (or the upright portion of the handle of the unit by means of the inwardly protruding connection 1724 shown in FIG. 18*a*). The brakes can then be rotated to a new position to engage the frame and flexibly lock into the position with the different "fish-mouth" also molded into the brake, so that a surface, generally flat, has been rotated into position underneath the wheel, thereby: (1) lifting the wheel(s) off the ground surface, so that it cannot roll; and (2) serving as a non-slip foot on which the unit rests, instead of on the wheels.

Since the front of the platform has feet, when both brakes are rotated and flexibly locked into the braking position, there are no wheels on which the unit rests, and it cannot roll. When a user wants to roll the unit, he/she has only to rotate/turn the brakes back into a rolling-ready position.

Although the invention has been described with the fender-like brakes rotating on the same axis with the wheel and integrated into the carrier, the same functionality could be obtained by attaching one or more pieces which rotate from another point of attachment, moving from a neutral position (i.e., wheels on the ground; the rotating pieces not rotated so they can touch the ground), to a position at which the brakes rest on the ground, thereby lifting the wheels off the ground and making the point of contact the underside of the brakes, which will not roll.

In accordance with a further embodiment of the invention, the legs 1708 of the unit may be mounted so that they can be pulled (or slid) out of the platform. Thereby, they can be extended out and away from the platform by molding extended feet onto the platform, or by incorporating extensions that slide out from or rotate out from the platform in order to increase the maximum horizontal dimension of the platform, so that the entire unit is more stable. In other words, the ratio of distance from the center of gravity of the unit and its load to the outer joint of the platform over the center point to the furthest dimension of the platform is decreased, improving stability.

Still further, concentric rings and/or non-concentric nested rings in the platform can be included that accommodate the bucket or tank or vessel of different bottom dimensions.

Figure 19A:
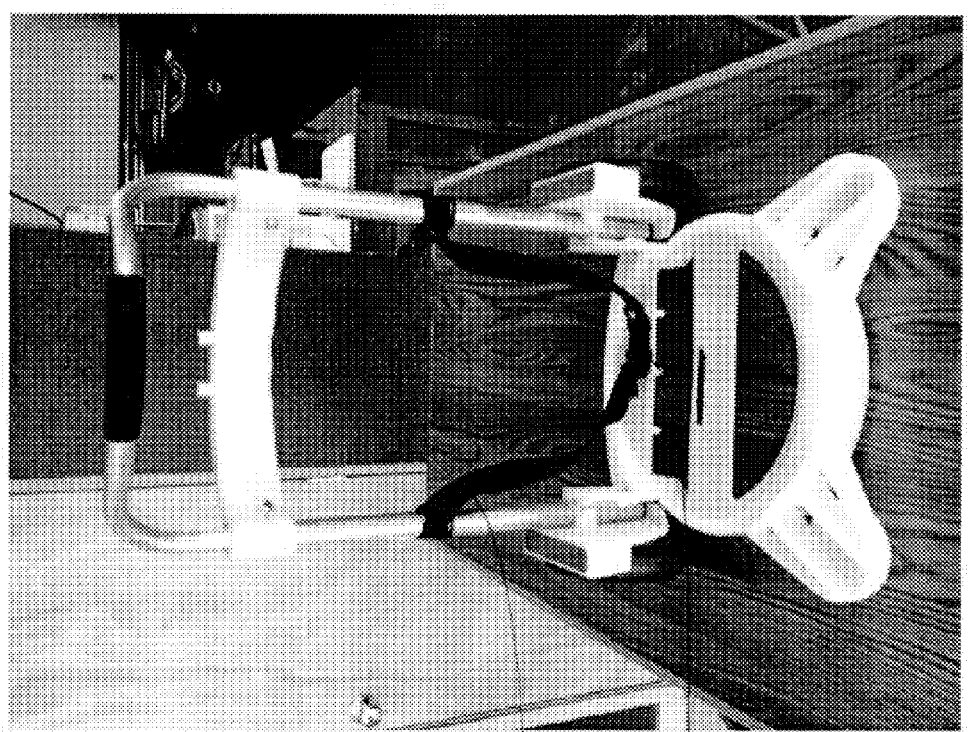
FIGS. 19a and 19b show a belt-style strap system for a container.
Figure 19B:
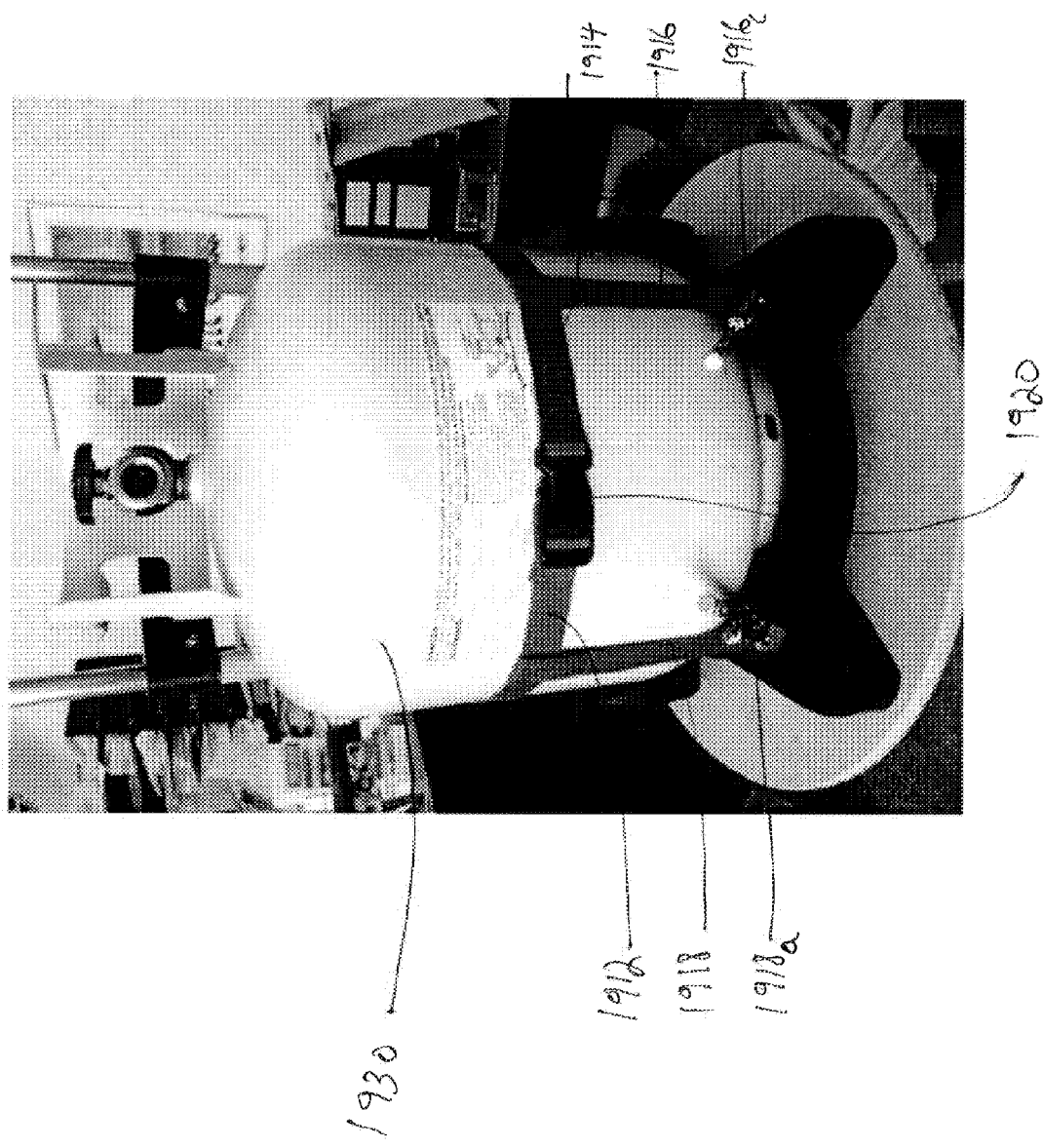
Figure 20:
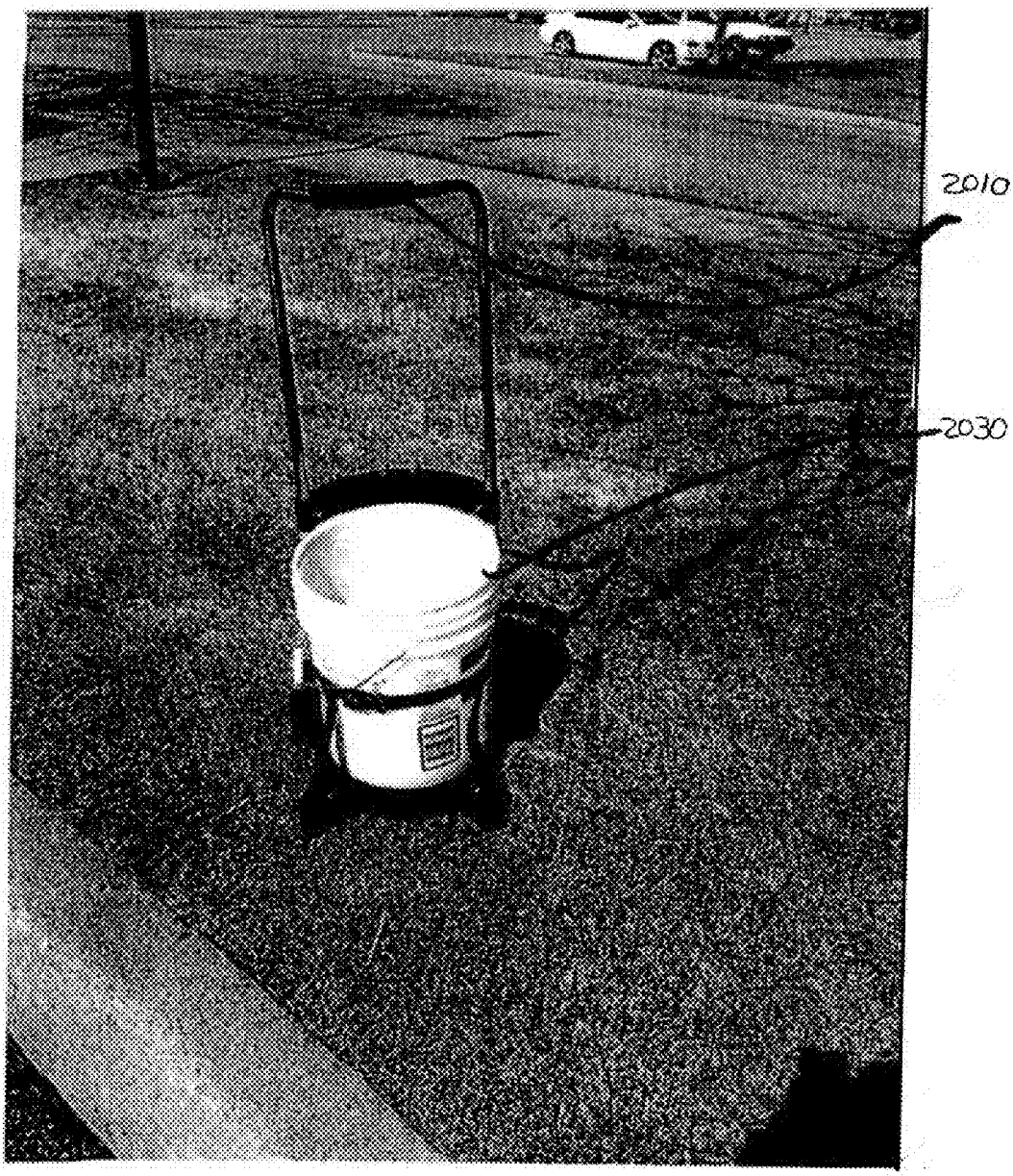
FIG. 20 shows the carrier 1700 with one type of a container.

Referring to FIGS. 19*a* and 19*b*, the wheeled carrier may comprise a strap system with a strap system with a left strap 1912, a right strap 1914 adjustably attachable to each other by a buckle 1920. Vertically extending straps 1918 and 1916, which are respectively anchored at 1918*a* and 1916*a*, enable tight holding onto the container, in this case, a gas tank 1930. The container can be a different type of container, for example, a bucket 2030, as shown in FIG. 20. The handle has an inwardly extending portion 2010 (FIG. 20), which can be raised up and down and brought down very close to the top of the container 2030. As described above, one embodiment of the strap system comprises a left strap 1912 and a right strap 1914, which are each securely fixed to upright support 1702 at one end and adjustably attachable to each other by buckle 1920.

With reference to the trolley and carriers previously described, the present invention also provides an additional feature referred to herein as a "travel clip" which is particularly adapted for the Bucket Buggy. The travel clip holds the bucket in place on the Bucket Buggy. It provides a restraint from above the bucket (preferred load) on the device. This travel clip feature is implemented in several embodiments thereof by reference to FIGS. 21a through 25b as described below.

Figure 21A:
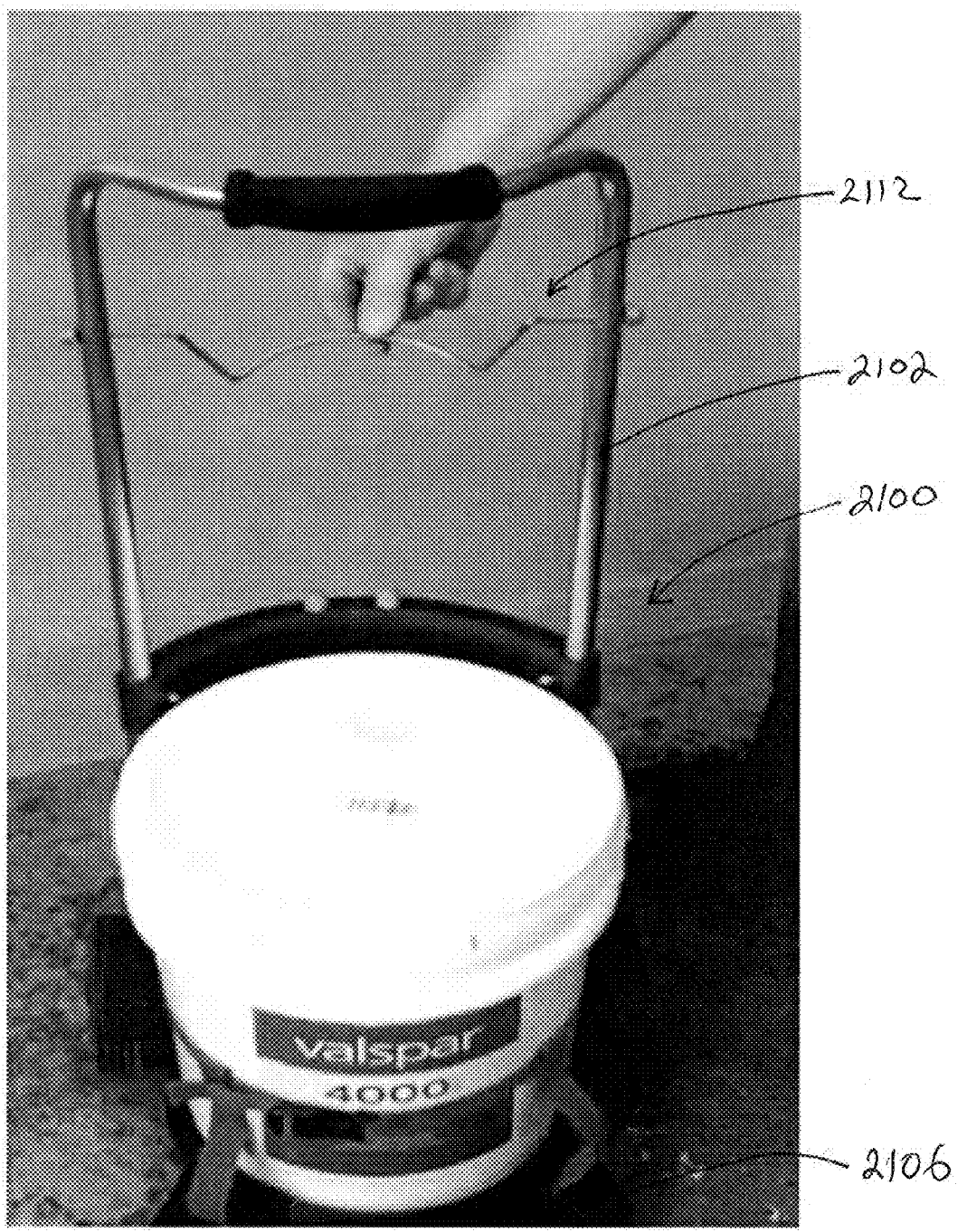
Figure 21B:
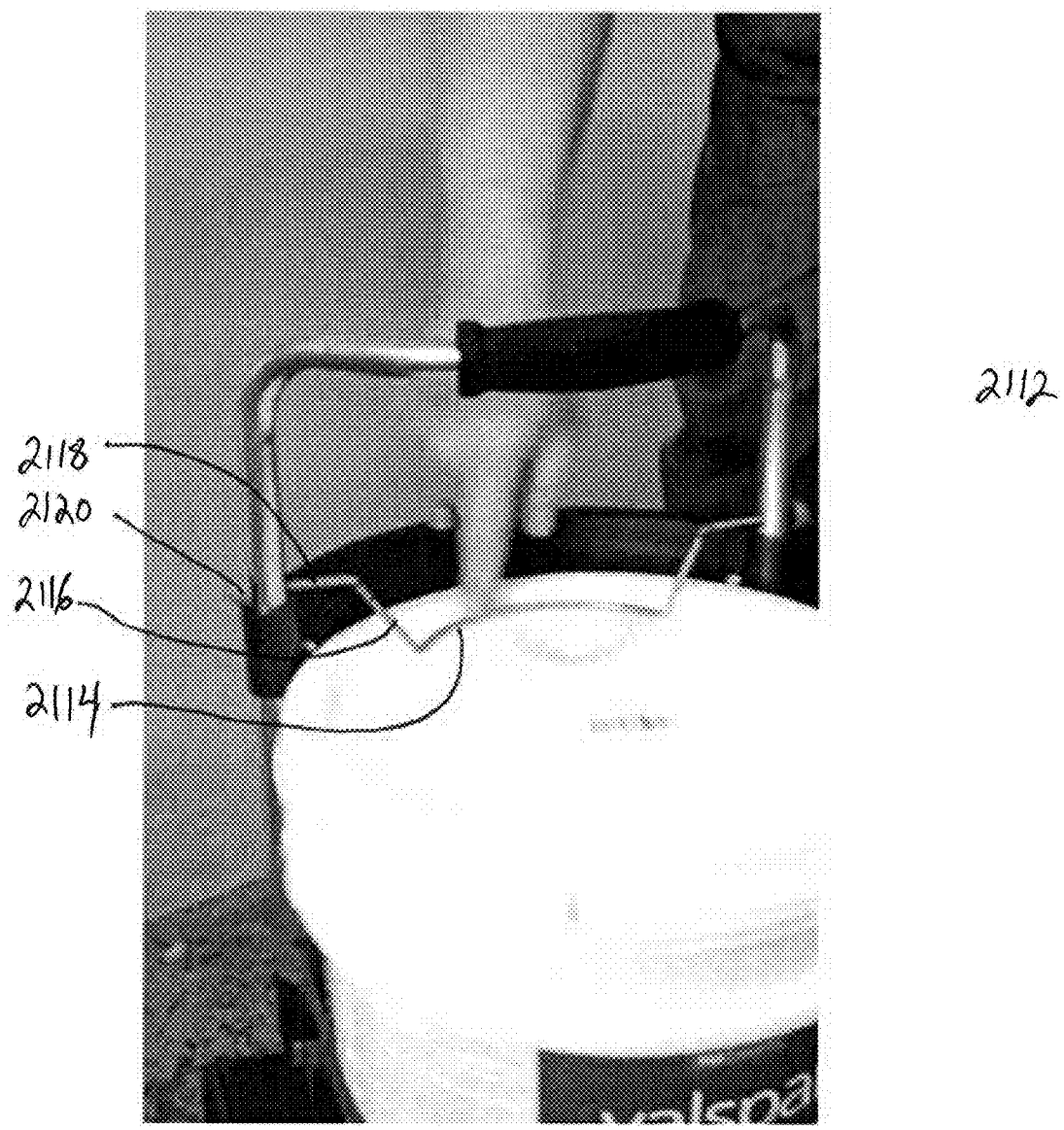
Figure 24B:
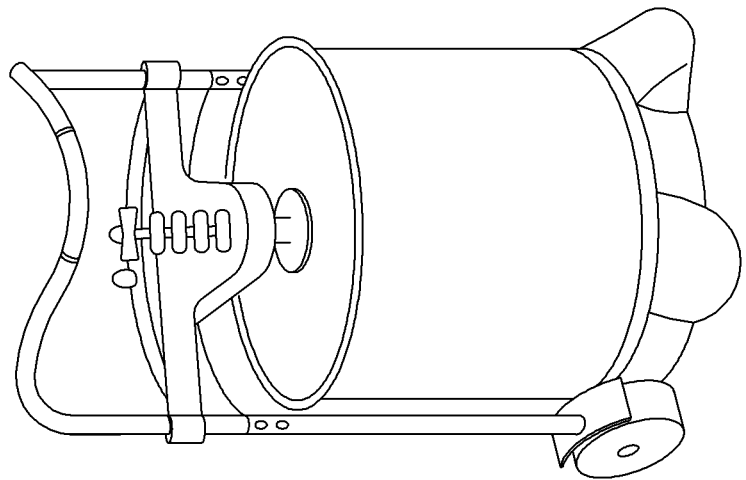
Figure 24A:
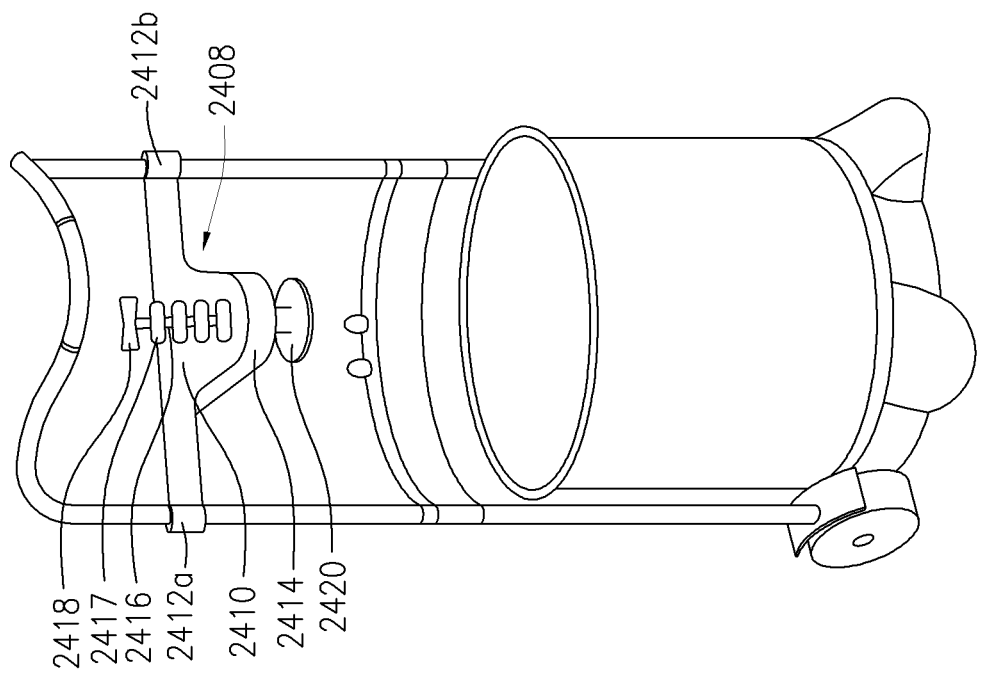

In FIG. 21a, the overall carrier 2100 has, as previously described, a platform 2106 and handle(s) 2102. The travel clip system 2112 can be embodied as shown in FIG. 21b by providing it with left and right arms 2118 which penetrate through the handles on the right side and the left side and aligned with plane of the handle arms. The clip system 2112 further includes at the left side a backwardly inclining leg 2118 that changes into the arcuate clip 2114 which is shaped to be located so that the clip bears on the lid of the bucket, in a manner which restrains and does not allow the bucket to tilt away even when the strap system is loosened or opened. The travel clip feature is fastened onto the bucket by lowering the handles as shown. The radius of curvature of the arcuate clip 2114 matches approximately the curvature of the bucket at a point on the lid where it is secured. The button locks 2120 cover the clip's protruding arms so that the arms are located relative to the handle and can pivot inside, between the handle arms.

The embodiment illustrated in FIGS. 21a, 21b, may be further modified to accommodate stacking two five gallon buckets, one on top of the other, on the same bucket buggy carrier. In this embodiment, a secondary retaining mechanism engages the top bucket which rests on the bottom bucket. Note that the wire restraint is shaped to match the lid contour and does not interfere with the stacking function. This retaining mechanism can be the same as the one shown in FIGS. 21a and 21b, but located higher on the handles. Alternatively, the retaining mechanism can be a strap system, a hoop, a retaining clip or any combinations thereof.

The preferred embodiment of this version of the carrier incorporates a metal platform. In general, it is noted that the materials from which the platforms for both the bucket buggy and the tank trolly are made can be virtually any moldable and/or machinable rigid material, although the preference is to use plastics or metals.

The travel clip is in effect a restraint that is inserted through both sides of the handle laterally and the restraint moves up and down as the handle is raised and lowered. The handle is raised in order to allow the bucket to be placed in a position on the Bucket Buggy, and when the handle is lowered toward the bucket and locked in the lowest position for lifting and transporting, the travel clip is simultaneously positioned above the bucket exerting downward pressure on the lid of the bucket and against the rim of the bucket to thereby hold the bucket in place and prevent the bucket from moving up relative to the platform, or forward away from the handle. When a lid is not on the bucket, the travel clip engages the top rim of the bucket to prevent it moving up or forward.

Figure 26A:
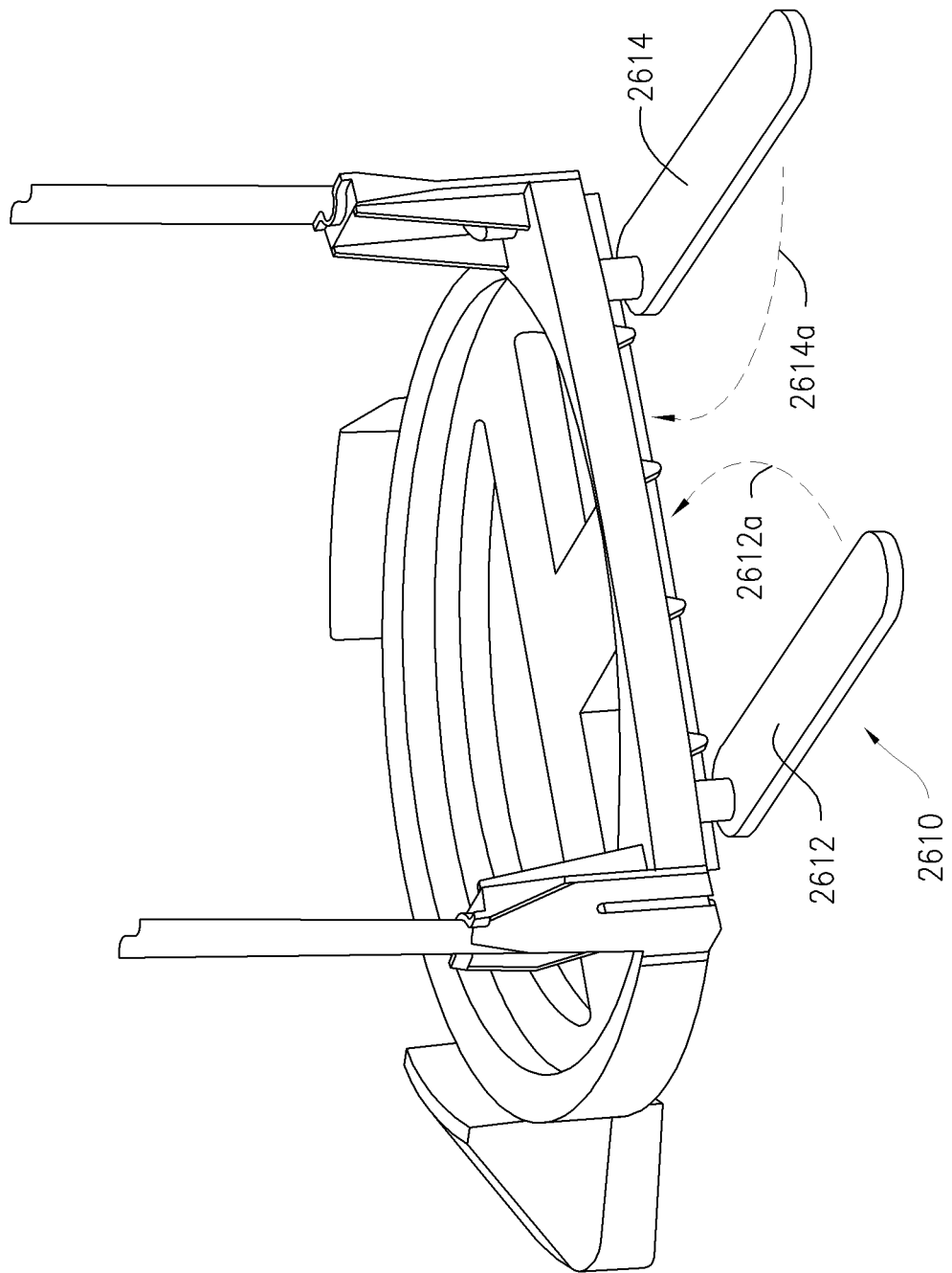
FIGS. 26a through 26c illustrate various rear stabilizers for the carriers of the present invention.
Figure 26B:
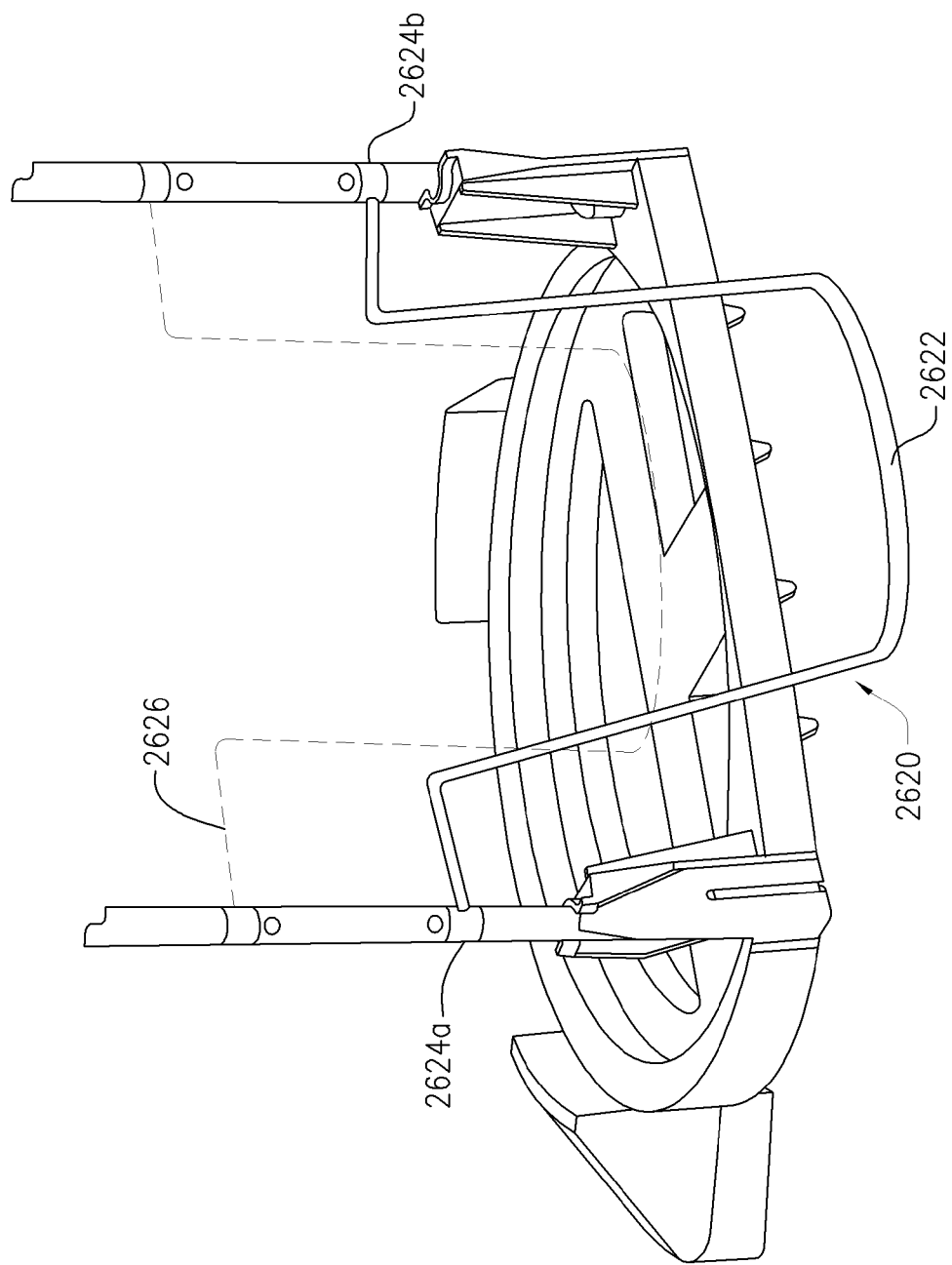
Figure 26C:
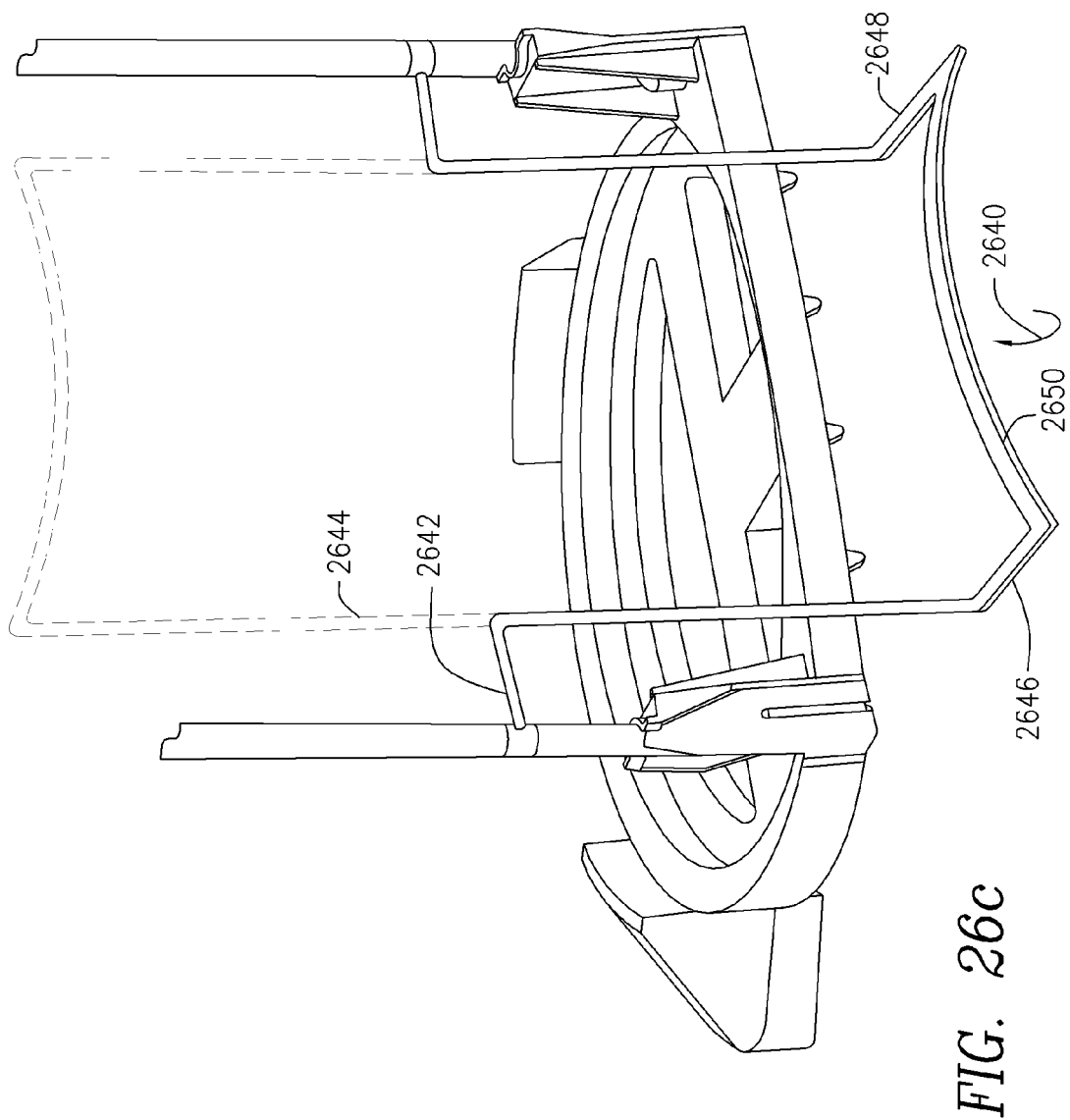

With reference to FIGS. 26a through 26c, the rear stabilizer 2610 of FIG. 26a, features a pair of rotatable arms 2612, 2614, which rotate about the indicated pivot shafts inwardly, as indicated by the respective arrows 2612a, 2614a. In FIG. 26b, the rear restraint 2620 comprises a floor engaging arcuate member 2622 which is connected to a paid of legs to horizontally extending hands that are fastened at the left and at the right through locking support collars 2624a, 2614b to the handles and which can be raised as indicated by the dashed lines 2626. In the embodiment of FIG. 26c, the rear restraint 2640 has a floor engaging structure comprising an arcuate member 2650 and a pair of horizontally extending arms 2646, 2648. The rear restraint 2640 has upright legs and arms that are rotatably supported in hinged collars 2642, and the entire rear restraint 2640 can be pivoted/rotated upwardly to the position indicated by the dashed lines 2644, The curvature of the arcuate number 2650 preferably matches the contour of the bucket to be carried on the carrier.

The restraint or clip can be fabricated of formed wire of either cold roll steel or flexible spring steel ("music wire"). In the described embodiment, the wire is formed into a simple torsion or compression spring configuration with a compression range of approximately 2 inches. The two sets of locking positions are provided in the handle member, so that, the lowest locking travel position, the spring provides downward stabilizing pressure on the bucket lid and/or rim for buckets ranging in height from 14 to approximately 15.5 inches. In the higher locking travel position, the spring provides downward stabilizing pressure for buckets ranging in height from approximately 15.5 to 17 inches.

A feature of this embodiment is that the travel clip is automatically engaged whenever the handle is lowered into the lifting and transporting position, and is automatically disengaged when the handle is raised into the rolling position.

In a similar embodiment, FIGS. 22a-22e show a wire style restraint which in accordance with FIG. 22a, comprises left and right fingers 2214, 2215, with downwardly angled first arm 2218a and right arm 2218b which criss-cross and re-bent to define arms 2222 that rejoin by forming the arcuate holding clip 2220. The same restraint 2212 can be seen from different viewing angles in FIGS. 22b and 22c and in an installed position in FIG. 22e. FIG. 22d shows the holding fingers installed in the handles in a cross sectional view.

In FIGS. 23a and 23b, the restrain 2308 comprises a cross bar 2310 with left and right collars 2312a, 2312b that are affixed around the handles of the carrier. A tab 2312 depends from the center of the cross bar 2310 and comprises a horizontal tab portion 2314 which can bear against the lid of the container as shown in FIG. 23b when the handle system is pressed down. The functionality is similar to the restraints described above.

In the aforementioned further embodiment, the restraint may be formed by molding a rigid plastic or metal bar with a hole in each end through which the ends of the handle member are inserted, comprising the aforementioned collars 2312a, 2312b around the handle tubes. The tab which may be metal or plastic and extends downward from the center of the rigid plastic metal bar, positioned above the bucket. When the handle is lowered into the travel position, the tab contacts the lid and/or rim of the bucket and exerts compression. The rigid plastic or metal bar can be slid into position by the user and is adjustably held in position by means of a series of small blind holes 2316 (FIG. 23a) in the surface of the handle into which a small button like extension inside the collars of the restraint bar can fittingly be inserted.

In yet another embodiment, the restraint 2408 similarly comprises a cross bar 2410, collars 2412a, 2412b and a depending tab with horizontal extension 2414. This embodiment differs from the prior one in that the tab 2414 has a central hole through which the shaft 2416 passes into a distal end of which a pressing tab 2420 is attached. The shaft 2416 is provided with multiple teeth 2417 and a handle 2418.

In this embodiment, the plastic or metal rigid bar 2410 may be fixed in place between the handle tubes, and instead of a tab extending downward, the horizontal tab 2414 has a key-hole insertion slot bolted in the middle thereof. Through this key-hole, the key like shaft or extension member 2417 is inserted downward and makes contact with the lid and/or rim of the bucket. This extension member has multiple locking positions along its length which enables the user to lock it into position by pushing the extension member downward until it makes contact with the top of the bucket and then turning the key 2418 a quarter-turn so that the teeth and the key cannot retract from the slot in the rigid bar.

This key like extension member described above may be configured as a ratcheting clip that extends through the slot in the rigid bar. The ratchet and clip may have a four inch adjustment range to accommodate the range in height of standard five gallon buckets. The clip is released by pinching the ends of the clip together and disengaging the teeth of ratchet from the slot in the rigid bar (no figure provided).

The various feature described relative to the different embodiments can be cross-replaced to evolve different constructions. For example, the cross bar may replace the rigid bar, etc. In other words, the cross bar may be affixed on the handles or designed to itself ride up and down on the handle and various mechanisms may be provided to effect the engagement between the cross bar collars and the handle.

In yet another embodiment, the restraint may comprise at least one, but preferably two restraints that are attached to the handle, or to the frame elements or the cross bar of the Bucket Buggy and are rotated or twisted into position to engage the lid of the bucket of the rim of the bucket.

Figure 25B:
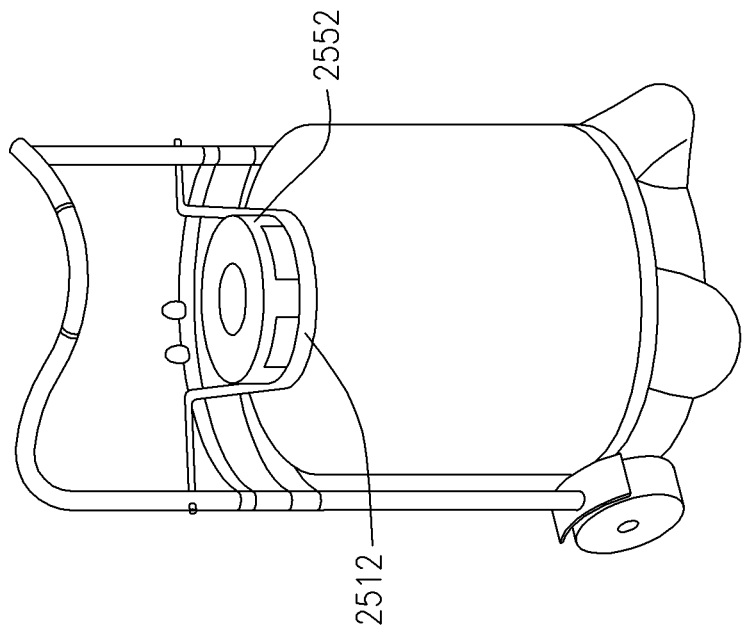
Figure 25A:
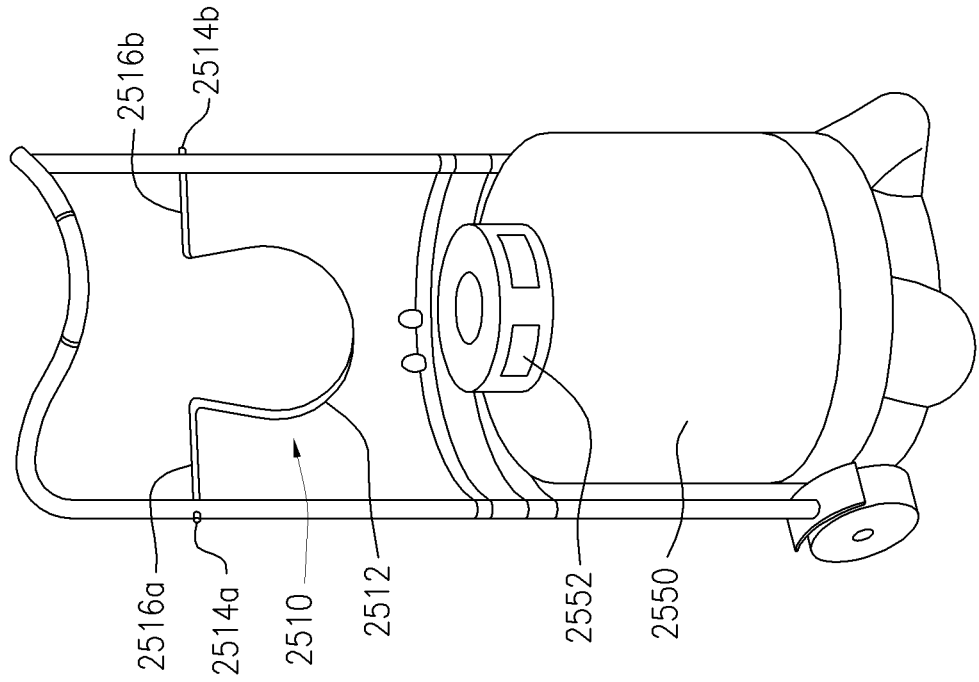

In the further restraint embodiment of FIGS. 25*a*, 25*b*, the restraint 2510 comprises left and right arms 2516*a* 2516*b* with portions that penetrate through the handles and are kept, respectively, at 2514*a*, 2514*b*. The arms support a loop 2512 that can be placed around the neck 2552 of the gas tank as shown in FIG. 25*b*, thereby providing the needed restraint and holding when the handle system is pushed down and the loop is placed over the neck. The restraint 2510 provides a restraining force from above and around the tank 2550 on the device.

Preferably, this restraint 2510 rotates freely in the two holes directly opposite each other and on each side of the handle and moves up and down as the handle is raised and lowered. The handle is raised in order to allow a tank (gas canister) to be placed in position on the tank trolley, and when the handle is lowered toward the tank, and the travel clip is positioned above the tank, it is rotated downward so that it encircles at least in part (an arc) of the side of the canister opposite the frame and handle and thereby holds the tank in place and prevents the tank from moving up relative to the platform or forward away from the handle frame members. The wire forming the restraint 2512 may be cold roll steel or flexible spring steel ("music wire") and as in other embodiments thereof, the loop 2512 may be supported on a cross bar of the carrier, or it may be insertion-molded into the cross bar or in yet another embodiment attached to the frame's vertical members.

An additional embodiment of the bucket buggy described herein, includes the addition of a rear stabilizing mechanism that extends from the back of the metal upright tubes, or rotates from the back of the platform. The stabilizing mechanism extends to the ground to reinforce the rear and lateral stability of the bucket buggy carrier when stacked with two buckets, particularly when stacked with two buckets. The preferred embodiment of this variation of the invention utilizes a spring steel truss system that can be engaged by the user but extends from the rear of the metal frame tubes and locks in place. The spring steel truss can be released when the carrier is wheeled, or used as a skid.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A wheeled carrier for containers, comprising:
   a) two wheels mounted to rotate about a common axis;
   b) a handle member configured to enable a user to roll the wheeled carrier;
   c) two brakes to prevent rolling or sliding of the wheeled carrier, each of said brakes being movable between a first position which enables rolling of the wheeled carrier, and a second position, at which the brakes rest on a ground surface and the wheels are lifted off the ground surface;
   d) a container support member configured to support a container;
   e) an axle member for the wheels that extends between and rotationally supports the wheels and wherein the handle member comprises two elongated strut members each having two ends with one end of each strut member being engaged with the axle member and extending away therefrom and the other end of each strut member is engaged with a handle gripping element, said container support member being configured to support said container such that at least a portion of the container extends over said axle member;
   f) a retaining element configured to retain the container at least partly on the axle member, the retaining element being removable from retaining the container; and
   g) wherein each brake comprises a roughened surface on a face thereof which is configured to face the ground surface and prevent skidding over the ground surface.

2. The wheeled carrier of claim 1, wherein the container is a standard five gallon bucket with the container support member being configured to at least partially fittingly engage a base of the bucket.

3. The wheeled carrier of claim 1, wherein the container has a center of gravity and the handle gripping element of the handle is configured to be directly above the center of gravity of a container, and aligned with a longitudinal dimension of the container supported by the container support member, with the container being carryable by the handle without tipping of the container, when the carrier is lifted.

4. The wheeled carrier of claim 3, wherein the strut members are configured for elongation, during use of the carrier and shortening for the storage of the wheeled carrier.

5. The wheeled carrier of claim 4, wherein the strut members are each configured with a locking position telescoping configuration for the elongation and shortening thereof.

6. The wheeled carrier of claim 4, wherein the strut members are configured to be elongated to a length at least that of twice the height of the container whereby two stacked containers are capable of being transported by the wheeled carrier.

7. The wheeled carrier of claim 1, wherein the strut members comprise at least one removable retaining element configured to engage the container to retard dislodgement or tipping of the container from the container support member.

8. The wheeled carrier of claim 7, wherein the retaining element comprises an arcuate hoop section fittingly conformed to the container, the hoop section having two ends which are hingedly attached to the strut members.

9. The wheeled carrier of claim 1, wherein the brakes comprise resilient elements that enable it to grasp and hold either the first or second position.

10. The wheeled carrier of claim 1, comprising legs which protrude from the container support member frontally thereof.

11. The wheeled carrier of claim 10, wherein the legs can be extended further away from the container support member.

12. The wheeled carrier of claim 1, comprising straps that can be tightened around a container supported on the container support member.

13. The wheeled carrier of claim 12, wherein the straps are made of a webbed, flexible material.

14. The wheel carrier of claim 1, including a restraint coupled to the wheeled carrier and operable to engage and restrain a load mounted for being carried on the carrier.

15. A wheeled carrier for containers, comprising:
  a) two wheels mounted to rotate about a common axis;
  b) a handle member configured to enable a user to roll the wheeled carrier;
  c) at least one brake to prevent rolling of the wheeled carrier, said at least one brake being movable between a first position which enables rolling of the wheeled carrier, and a second position, at which the at least one brake rests on a ground surface and at least one of the wheels is lifted off the ground surface; and
  d) a container support member configured to support a container adjacent the axis;
  including an axle member for the wheels and wherein the handle member comprises two elongated strut members each having two ends with one end of each strut member being engaged with the axle member and extending away therefrom and the other end of each strut member being engaged with a handle gripping element;
  wherein the container support member includes a portion thereof which extends away from the axle member and is configured to engage a full base of the container and wherein the extending portion of the container support member is foldable onto the strut members for storage of the wheeled carrier; and
  wherein the extending portion of the container support member is configured to rest on a floor or ground and to hold the container parallel to the ground and whereby the fixed position engagement between the strut members and the axle member is releasable such that the strut members are capable of being moved to a position of an obtuse angle relative to the container support member, whereby the wheeled carrier is convertible to a moving skid for the container.

* * * * *